US009078038B2

(12) United States Patent
Talbert

(10) Patent No.: US 9,078,038 B2
(45) Date of Patent: Jul. 7, 2015

(54) AUTOMATIC PROVISIONING OF SET-TOP BOXES

(75) Inventor: Michael John Talbert, Nazareth, PA (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 1184 days.

(21) Appl. No.: 12/331,710

(22) Filed: Dec. 10, 2008

(65) Prior Publication Data

US 2010/0083335 A1 Apr. 1, 2010

Related U.S. Application Data

(60) Provisional application No. 61/101,012, filed on Sep. 29, 2008.

(51) Int. Cl.

| | |
|---|---|
| ***H04N 17/04*** | (2006.01) |
| ***H04N 21/442*** | (2011.01) |
| ***H04N 21/443*** | (2011.01) |
| *H04N 21/25* | (2011.01) |
| *H04N 21/475* | (2011.01) |

(52) U.S. Cl.

CPC ............ *H04N 21/4432* (2013.01); *H04N 17/04* (2013.01); *H04N 21/252* (2013.01); *H04N 21/44204* (2013.01); *H04N 21/4756* (2013.01); *H04N 21/44209* (2013.01); *H04N 21/44227* (2013.01); *H04N 21/44231* (2013.01); *H04N 21/4424* (2013.01)

(58) Field of Classification Search

CPC H04N 17/04; H04N 21/4424; H04N 21/4432

USPC ......................... 725/105, 107, 114–118, 129; 370/241–244, 250; 709/217–224

See application file for complete search history.

(56) References Cited

U.S. PATENT DOCUMENTS

| | | | | |
|---|---|---|---|---|
| 7,194,756 | B2 * | 3/2007 | Addington et al. | 725/116 |
| 7,574,730 | B1 * | 8/2009 | Masuda et al. | 725/124 |
| 7,596,799 | B2 * | 9/2009 | Chen | 725/87 |
| 2002/0012347 | A1 * | 1/2002 | Fitzpatrick | 370/392 |
| 2005/0076385 | A1 * | 4/2005 | Li et al. | 725/111 |
| 2006/0143299 | A1 * | 6/2006 | Jones et al. | 709/227 |
| 2007/0050836 | A1 * | 3/2007 | Stanek et al. | 725/131 |
| 2009/0089854 | A1 * | 4/2009 | Le et al. | 725/139 |
| 2010/0011391 | A1 * | 1/2010 | Carpenter et al. | 725/25 |

* cited by examiner

*Primary Examiner* — Junior Mendoza
*Assistant Examiner* — Jason Thomas

(57) ABSTRACT

A set-top box (STB) detects activation of the STB, and performs, in response to the activation of the STB, a health check of the STB. The STB also detects connection of the STB with a network, and performs, in response to the connection of the STB, the following: a pre-provisioning of the STB, a provisioning of the STB, and a service check of the STB.

24 Claims, 26 Drawing Sheets

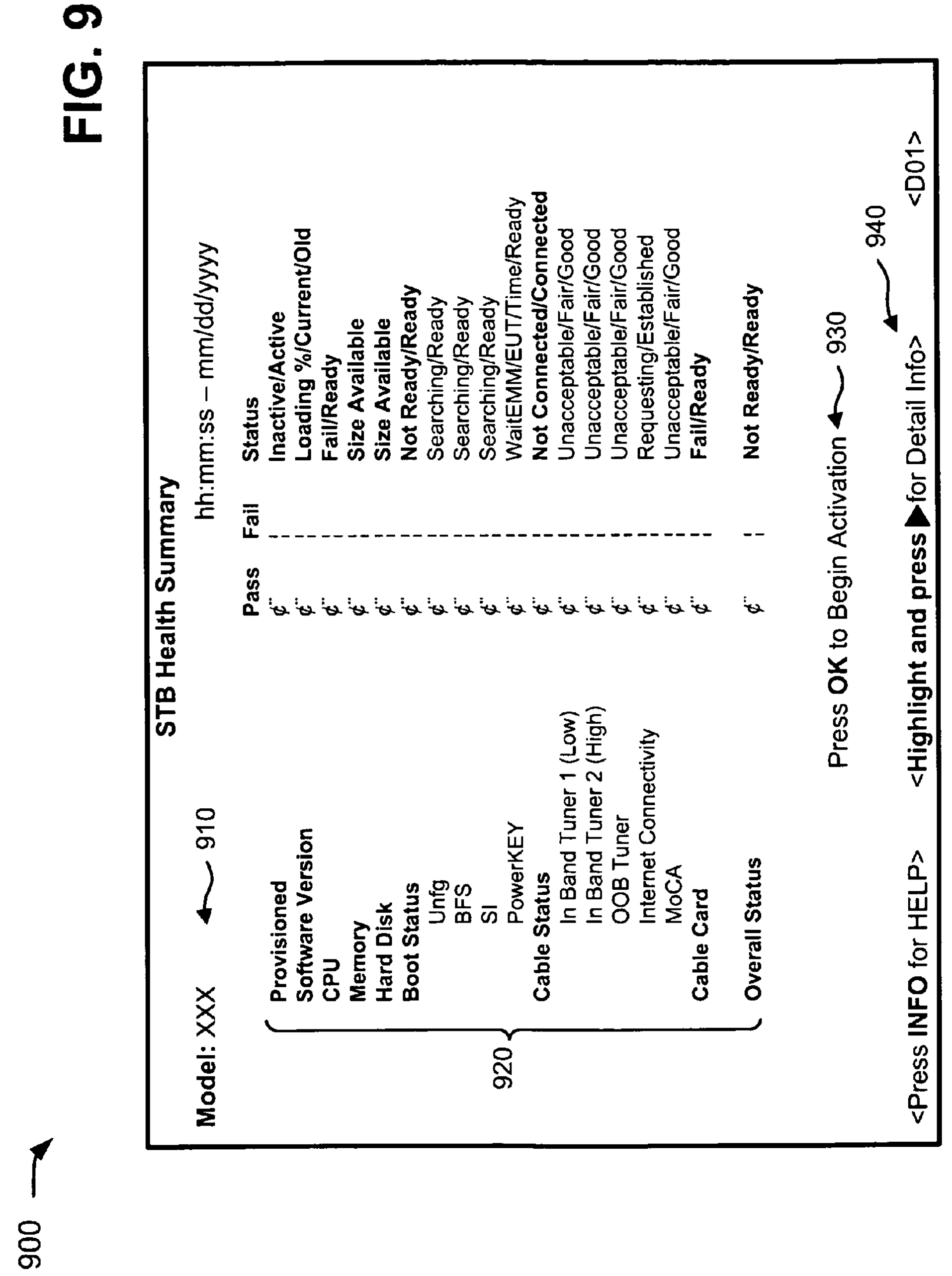

FIG. 9

STB Health Summary

Model: XXX ← 910                    hh:mm:ss – mm/dd/yyyy

|  | Pass | Fail | Status |
|---|---|---|---|
| **Provisioned** | ✓ | -- | Inactive/**Active** |
| **Software Version** | ✓ | -- | Loading %/**Current**/Old |
| **CPU** | ✓ | -- | **Fail**/Ready |
| **Memory** | ✓ | -- | Size Available |
| **Hard Disk** | ✓ | -- | Size Available |
| **Boot Status** | ✓ | -- | Not Ready/**Ready** |
|    Unfg | ✓ | -- | Searching/Ready |
|    BFS | ✓ | -- | Searching/Ready |
|    SI | ✓ | -- | Searching/Ready |
|    PowerKEY | ✓ | -- | WaitEMM/EUT/Time/Ready |
| **Cable Status** | ✓ | -- | Not Connected/**Connected** |
|    In Band Tuner 1 (Low) | ✓ | -- | Unacceptable/Fair/Good |
|    In Band Tuner 2 (High) | ✓ | -- | Unacceptable/Fair/Good |
|    OOB Tuner | ✓ | -- | Unacceptable/Fair/Good |
|    Internet Connectivity | ✓ | -- | Requesting/Established |
|    MoCA | ✓ | -- | Unacceptable/Fair/Good |
| **Cable Card** | ✓ | -- | **Fail**/Ready |
| **Overall Status** | ✓ | -- | Not Ready/**Ready** |

920 braces the rows from Provisioned through Cable Card.

Press OK to Begin Activation ← 930

<Press INFO for HELP>    <Highlight and press ▲ for Detail Info>    <D01>
                                                              ↑ 940

900

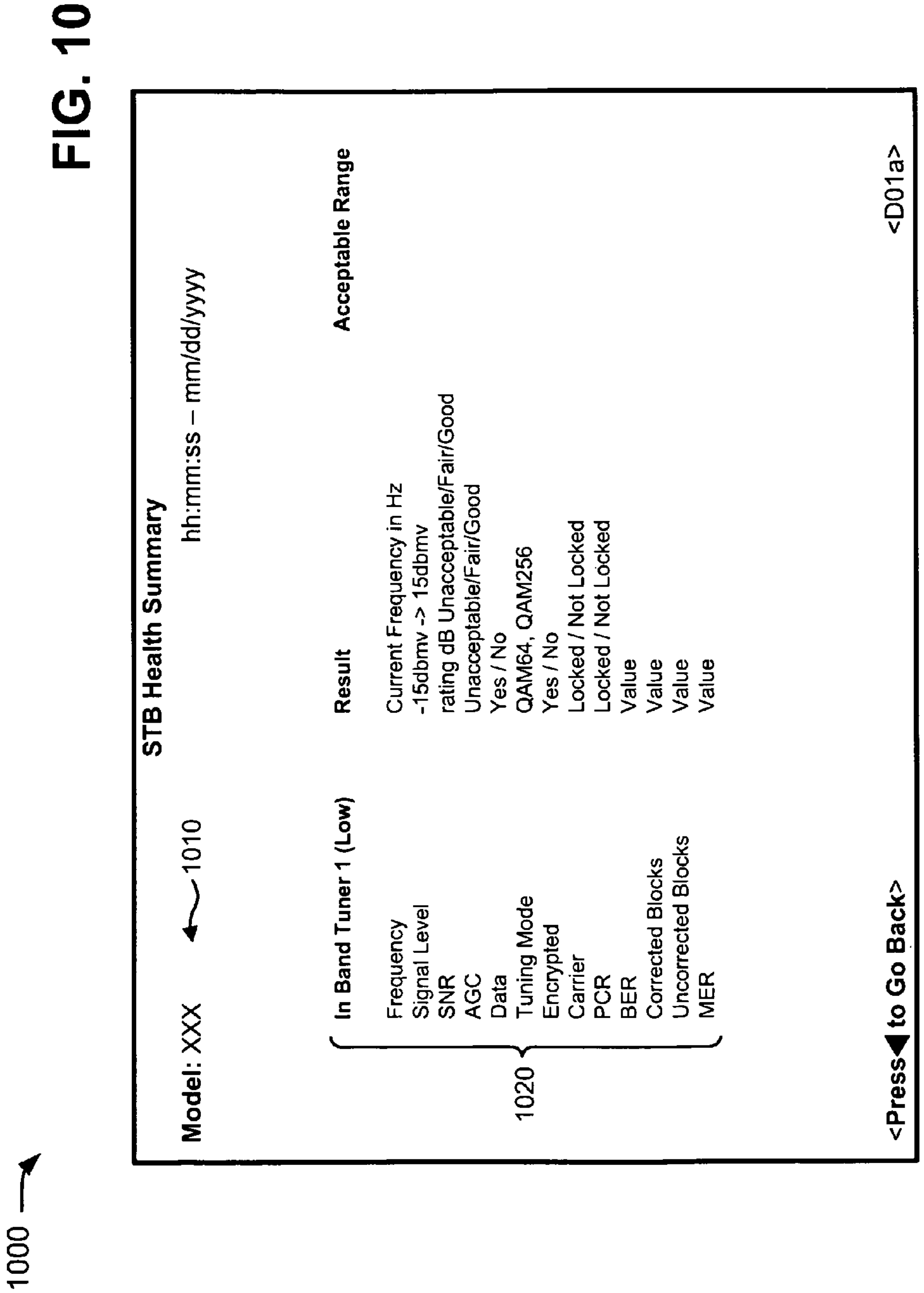

FIG. 10

Model: XXX  　　STB Health Summary
　　　　　　　　hh:mm:ss – mm/dd/yyyy

←—1010

| In Band Tuner 1 (Low) | Result | Acceptable Range |

Frequency　　　　　Current Frequency in Hz
Signal Level　　　　-15dbmv -> 15dbmv
SNR　　　　　　　　rating dB Unacceptable/Fair/Good
AGC　　　　　　　　Unacceptable/Fair/Good
Data　　　　　　　　Yes / No
Tuning Mode　　　　QAM64, QAM256
Encrypted　　　　　Yes / No
Carrier　　　　　　　Locked / Not Locked
PCR　　　　　　　　Locked / Not Locked
BER　　　　　　　　Value
Corrected Blocks　　Value
Uncorrected Blocks　Value
MER　　　　　　　　Value

1020

<Press◀ to Go Back>　　　　　　　　　　　　　　<D01a>

1000

1100

STB Health Summary

Model: XXX ← 1210  hh:mm:ss – mm/dd/yyyy

| **OOB Tuner** | **Result** | **Acceptable Range** |
|---|---|---|
| Carrier | Locked / Hunting | |
| Frequency | xxx.xx | |
| Signal Level | Dbmv | |
| SNR | Value | |
| BER | Value | |
| Corrected Blocks | Value | |
| Uncorrected Blocks | Value | |
| EMM Data Present | Yes / No | |
| Packets Received | Value | |
| PID | Value | |

1220

<Press◄ to Go Back>                    <D01c>

1200

Model: XXX  STB Health Summary  hh:mm:ss – mm/dd/yyyy

← 1310

| IP Status | Result | Acceptable Range |
|---|---|---|
| MAC Address | Value | |
| IP Address | Value xxx.xxx.xxx.xxx | |
| Subnet Mask | Value | |
| Gateway | Value | |
| DNS1 | Value | |
| DNS2 | Value | |
| Lease Time Acquire | hh:mm:ss - mm/dd/yyyy | |
| Lease Time Expire | hh:mm:ss - mm/dd/yyyy | |
| ISDS Resolved | Yes / No / NA | |
| Poll Status | Last Req / Last Ack | |

1320

<Press◄ to Go Back>                                <D01d>

1300

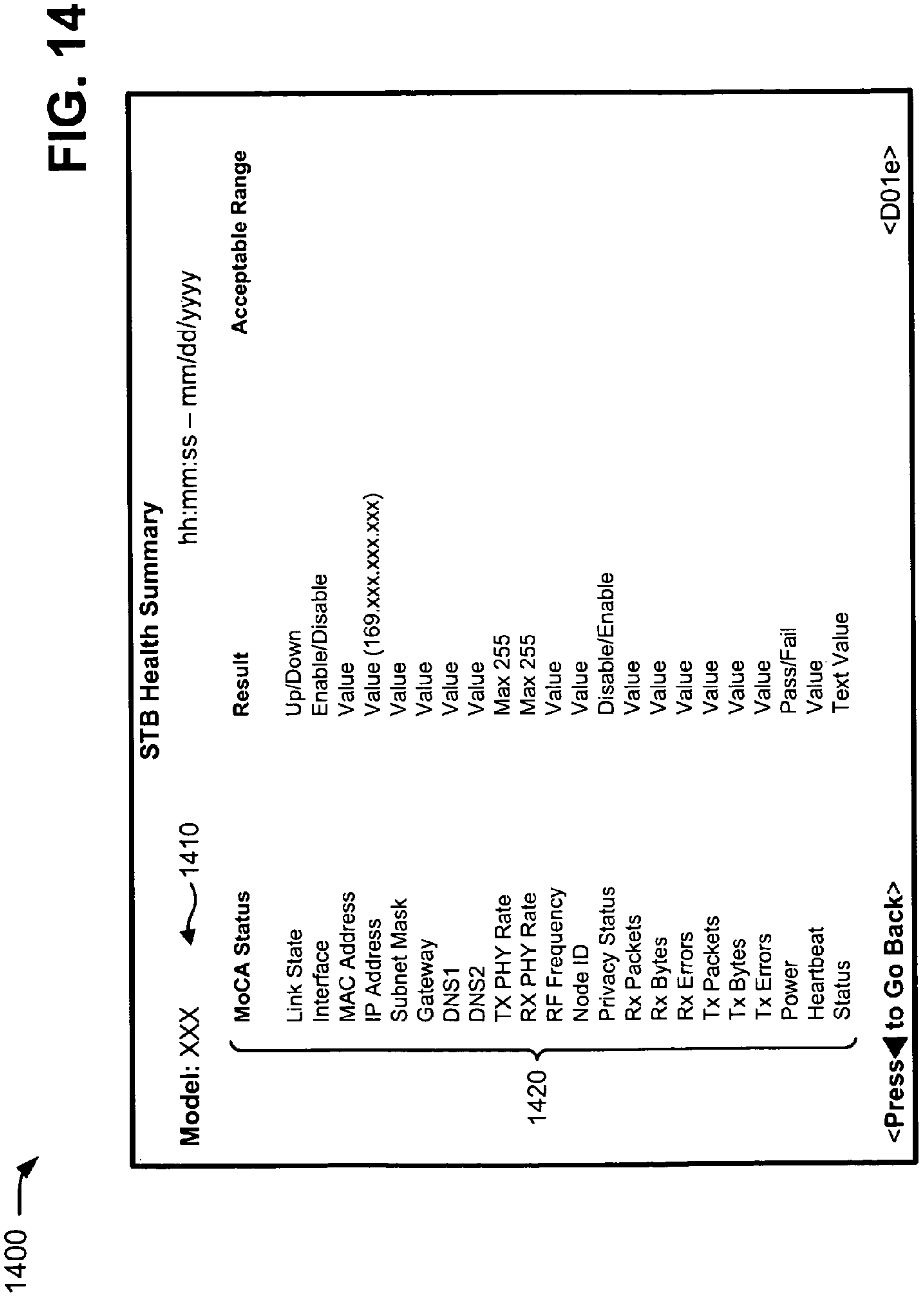

FIG. 14

Model: XXX  　　　　　　　　STB Health Summary
　　　　　　　　　　　　　　　　hh:mm:ss – mm/dd/yyyy

| MoCA Status ← 1410 | Result | Acceptable Range |
|---|---|---|
| Link State | Up/Down | |
| Interface | Enable/Disable | |
| MAC Address | Value | |
| IP Address | Value (169.xxx.xxx.xxx) | |
| Subnet Mask | Value | |
| Gateway | Value | |
| DNS1 | Value | |
| DNS2 | Value | |
| TX PHY Rate | Max 255 | |
| RX PHY Rate | Max 255 | |
| RF Frequency | Value | |
| Node ID | Value | |
| Privacy Status | Disable/Enable | |
| Rx Packets | Value | |
| Rx Bytes | Value | |
| Rx Errors | Value | |
| Tx Packets | Value | |
| Tx Bytes | Value | |
| Tx Errors | Value | |
| Power | Pass/Fail | |
| Heartbeat | Value | |
| Status | Text Value | |

1420

<Press◀ to Go Back>　　　　　　　　　　　　　　　<D01e>

1400

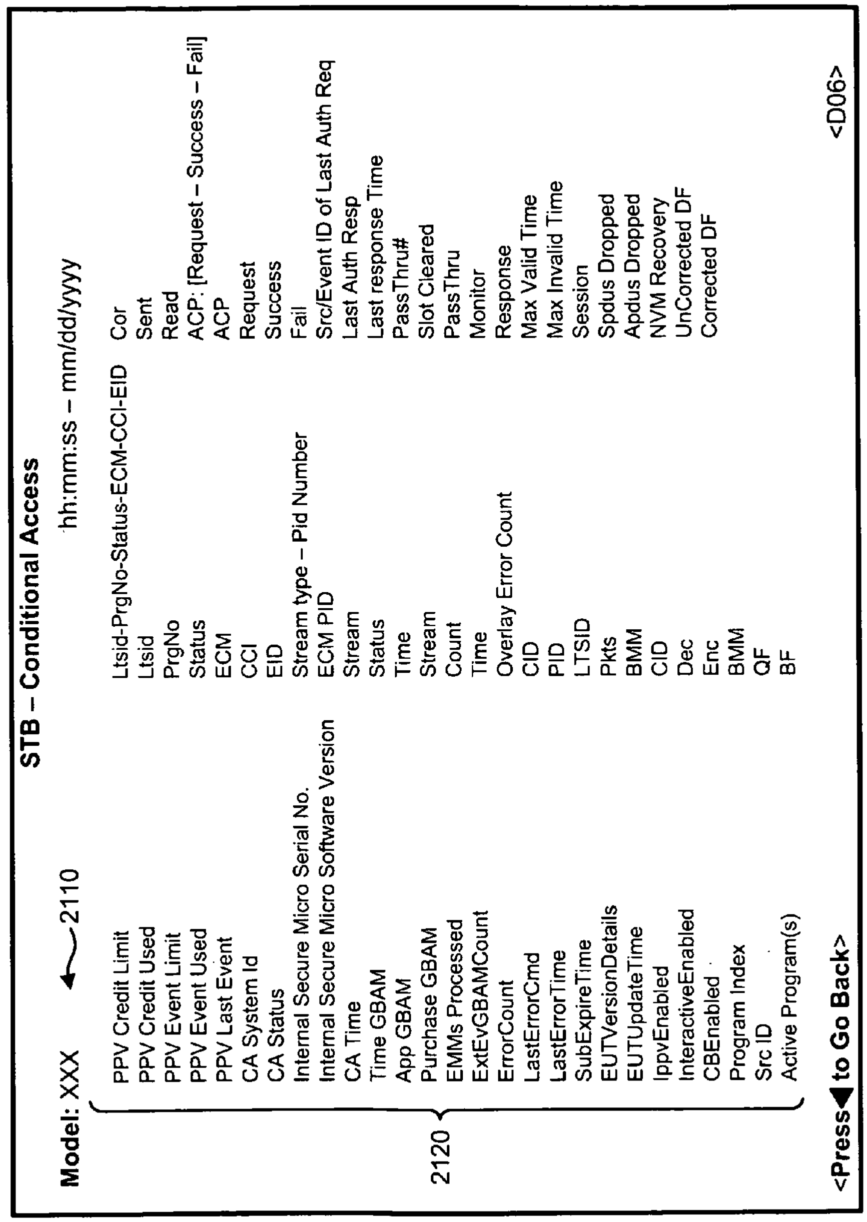

FIG. 21

STB – Conditional Access

Model: XXX  ←2110  hh:mm:ss – mm/dd/yyyy

| Field | Value |
|---|---|
| PPV Credit Limit | |
| PPV Credit Used | |
| PPV Event Limit | |
| PPV Event Used | |
| PPV Last Event | Ltsid-PrgNo-Status-ECM-CCI-EID |
| CA System Id | Ltsid |
| CA Status | PrgNo |
| Internal Secure Micro Serial No. | Status |
| Internal Secure Micro Software Version | ECM |
| CA Time | CCI |
| Time GBAM | EID |
| App GBAM | Stream type – Pid Number |
| Purchase GBAM | ECM PID |
| EMMs Processed | Stream |
| ExtEvGBAMCount | Status |
| ErrorCount | Time |
| LastErrorCmd | Stream |
| LastErrorTime | Count |
| SubExpireTime | Time |
| EUTVersionDetails | Overlay Error Count |
| EUTUpdateTime | CID |
| IppvEnabled | PID |
| InteractiveEnabled | LTSID |
| CBEnabled | Pkts |
| Program Index | BMM |
| Src ID | CID |
| Active Program(s) | Dec |
| | Enc |
| | BMM |
| | QF |
| | BF |

Values (right column):
Cor
Sent
Read
ACP: [Request – Success – Fail]
ACP
Request
Success
Fail
Src/Event ID of Last Auth Req
Last Auth Resp
Last response Time
PassThru#
Slot Cleared
PassThru
Monitor
Response
Max Valid Time
Max Invalid Time
Session
Spdus Dropped
Apdus Dropped
NVM Recovery
UnCorrected DF
Corrected DF

2120

<Press◀ to Go Back>    <D06>

2100

FIG. 25
2330
START
AUTOMATICALLY ACTIVATE STB TO RECEIVE PROGRAM ENTITLEMENT INFORMATION
2500
AUTOMATICALLY VALIDATE CABLE CARD ASSOCIATED WITH STB
2510

AUTOMATIC PROVISIONING OF SET-TOP BOXES

RELATED APPLICATION

This application claims priority under 35 U.S.C. §119 based on U.S. Provisional Application No. 61/101,012, filed Sep. 29, 2008, the disclosure of which is incorporated by reference herein in its entirety.

BACKGROUND

Installation of a set-top box (STB) involves a field technician (e.g., associated with a company providing television services) performing a manual radio frequency (RF) health check of the STB with a meter (e.g., prior to installing the STB), and performing a manual initialization of the STB (e.g., the field technician causes the STB to provide an initialization (INIT) message to one or more servers associated with the company). After manual initialization of the STB, the field technician manually causes the STB to provide an activation message (e.g., to activate the STB) to the one or more servers associated with the company. The field technician manually reviews visual indicators provided to the STB during the installation process, and manually checks channels provided to the STB to confirm channel entitlements. The field technician also manually checks applications associated with the STB (e.g., video on demand (VOD), an electronic program guide (EPG), digital video recorder (DVR) functionality, etc.) to ensure that the applications are functioning correctly.

Such a manual STB installation process is time consuming, costly, and susceptible to human errors. Furthermore, human errors introduced during the STB installation process may cause the STB to not function correctly in the future, which may require the field technician to return to the customer's premises and correct the errors.

BRIEF DESCRIPTION OF THE DRAWINGS

FIGS. 8-22 illustrate diagrams of exemplary user interfaces capable of being generated by the STB, the server, and/or a display of the network depicted in FIG. 1.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may enable a field technician installing or replacing a set-top box (STB) at a customer's premises to automatically provision the STB (e.g., "plug and play provisioning of the STB") and to automatically perform a "health check" of the STB. Such an arrangement may reduce STB installation time and may improve the field technician's efficiency during installation of the STB (e.g., may reduce human errors). Furthermore, the systems and/or methods described herein may enable the provider of the STB to ship the STB to a customer, and the customer may install the STB (e.g., without a field technician). This may increase customer satisfaction (e.g., the customer does not need to wait for the field technician), and may eliminate the cost of dispatching a field technician. The systems and/or methods described herein may also enable an installed STB (e.g., that loses information) to automatically correct itself and recover the lost information.

In one implementation, for example, the systems and/or methods may automatically perform a health check of a set-top box (STB) prior to installation of the STB, and may automatically pre-provision the STB during installation of the STB. The systems and/or methods may automatically provision the STB during installation of the STB, and may automatically perform a service check of the STB during the STB installation.

As used herein, the terms "subscriber," "customer," and "user" may be used interchangeably. Also, the terms "subscriber," "customer," and "user" are intended to be broadly interpreted to include a STB and/or a display associated with the STB or a user (e.g., a field technician associated with a company providing the STB (e.g., an television services), a customer of the company, etc.) of a STB and/or a display associated with the STB.

Figure 1:
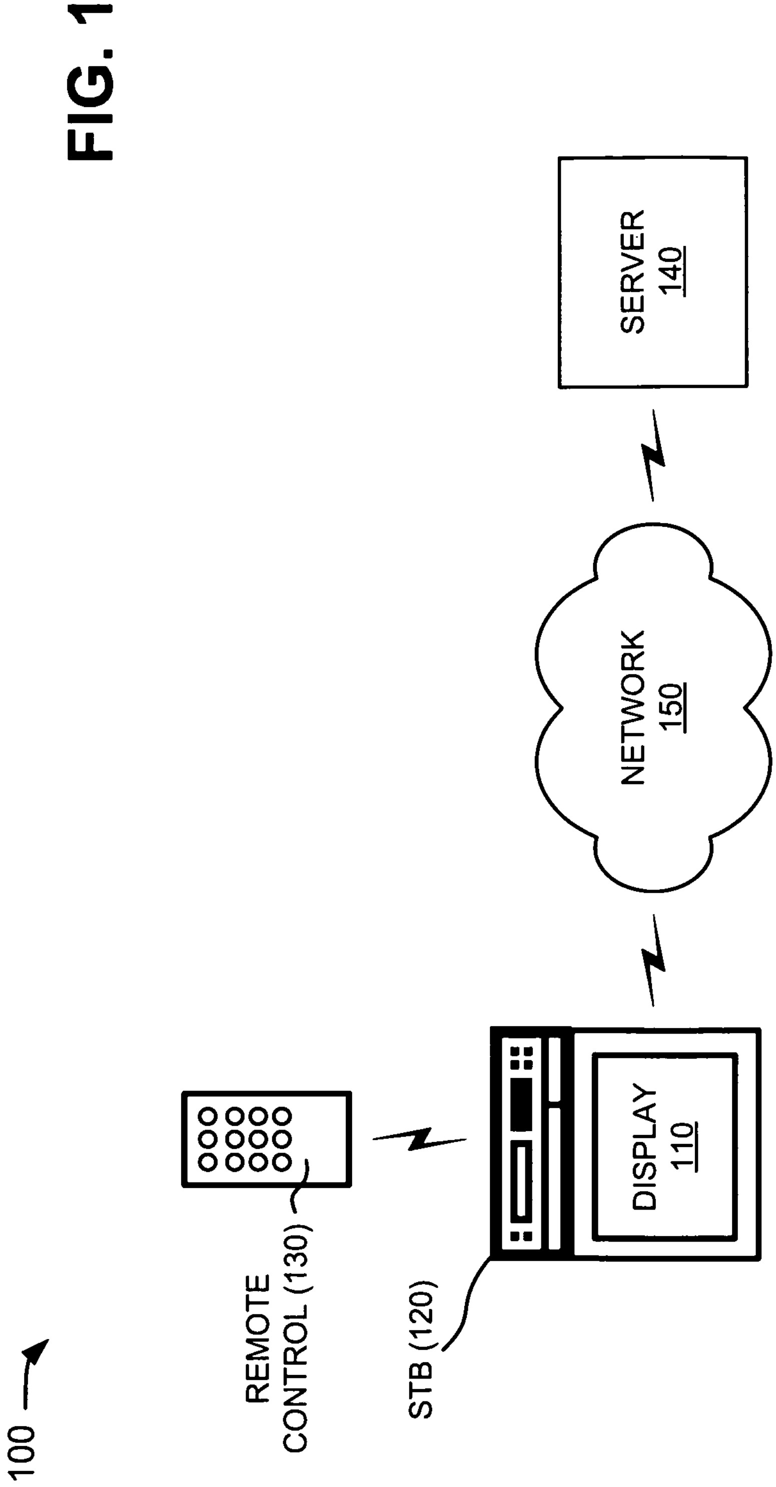
FIG. 1 depicts a diagram of an exemplary network in which systems and/or methods described herein may be implemented.

FIG. 1 is a diagram of an exemplary network 100 in which systems and methods described herein may be implemented. As illustrated, network 100 may include a display 110, a STB 120, a remote control 130, and a server 140 interconnected by a network 150. Components of network 100 may interconnect via wired and/or wireless connections. A single display 110, STB 120, remote control 130, server 140, and network 150 have been illustrated in FIG. 1 for simplicity. In practice, there may be more displays 110, STBs 120, remote controls 130, servers 140, and/or networks 150. Also, in some instances, one or more of the components of network 100 may perform one or more functions described as being performed by another one or more of the components of network 100.

Display 110 may include any type of display that is capable of displaying television programming, content provided by STB 120, and/or content provided by other devices (e.g., a digital video disk (DVD) player, a video camera, etc., not shown) connected to display 110. Display 110 may be implemented as a stand-alone device and/or may be integrated into another device. In one implementation, some or all of the functions described as being performed by STB 120 may be performed by display 110 (e.g., STB 120 may be integrated within display 110, display 110 may include a cable card, etc.).

STB 120 may include a device that receives television programming (e.g., from server 140), and provides the television programming to display 110 or another device. STB

120 may allow a user to alter the programming provided to display 110 based on a signal (e.g., a channel up or channel down signal) from remote control 130. STB 120 may record video in a digital format to a disk drive or other memory medium within STB 120. In one example, STB 120 may be incorporated directly within display 110 and/or may include a digital video recorder (DVR). In one implementation, STB 120 may permit a user to obtain on screen diagnostics relating to STB 120.

Remote control 130 may include a device that allows a user to control programming and/or content displayed on display 110 via interaction with television and/or STB 120.

Server 140 may include one or more server entities, or other types of computation or communication devices, that gather, process, search, and/or provide information in a manner described herein. In one implementation, server 140 may include a computer, a computer system, an application, a cable head-end, and/or a broadcasting device capable of providing content (e.g., subscription video packages, television programming, movies, on-demand services, live television, etc.) and/or other information to STB 120. In one example, server 140 may receive information from STB 120 and may provide information, such as television programming and on screen diagnostic information, to STB 120.

Network 150 may include a local area network (LAN), a wide area network (WAN), a metropolitan area network (MAN), a telephone network, such as the Public Switched Telephone Network (PSTN), an intranet, the Internet, an optical fiber (or fiber optic)-based network, or a combination of networks.

Figure 2:
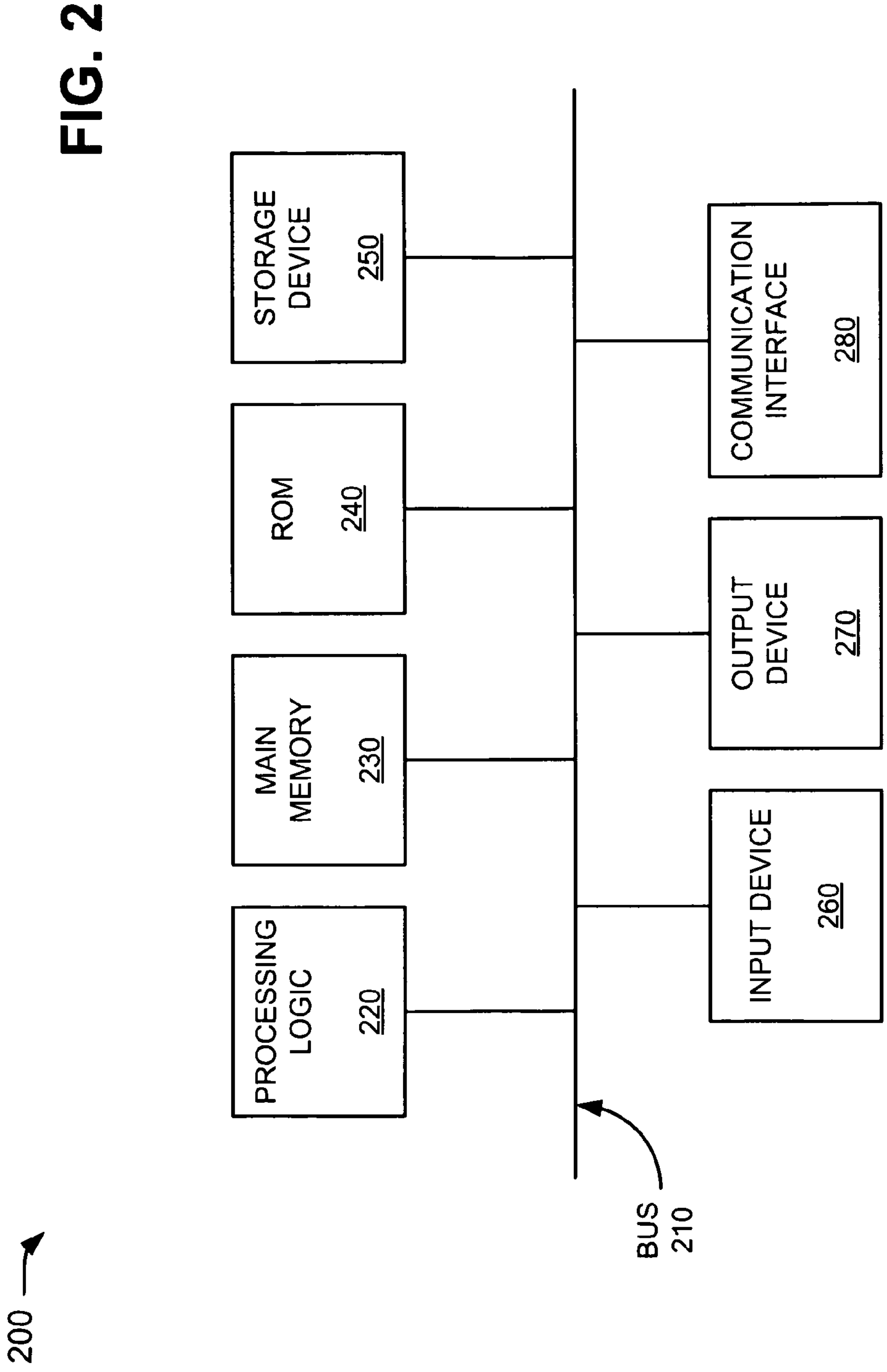
FIG. 2 illustrates a diagram of exemplary components of a server of the network depicted in FIG. 1.

FIG. 2 illustrates a diagram of exemplary components of a device 200 that may correspond to server 140. As illustrated, device 200 may include a bus 210, processing logic 220, a main memory 230, a read-only memory (ROM) 240, a storage device 250, an input device 260, an output device 270, and/or a communication interface 280.

Bus 210 may include a path that permits communication among the components of device 200. Processing logic 220 may include one or more processors, microprocessors, or other types of processing logic that may interpret and execute instructions. Main memory 230 may include a random access memory (RAM) or another type of dynamic storage device that may store information and instructions for execution by processing logic 220. ROM 240 may include a ROM device or another type of static storage device that may store static information and/or instructions for use by processing logic 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, remote control 130, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 150.

As described herein, device 200 may perform certain operations in response to processing logic 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processing logic 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, differently arranged, or additional components than depicted in FIG. 2. In still other implementations, one or more components of device 200 may perform one or more other tasks described as being performed by one or more other components of device 200.

Figure 3:
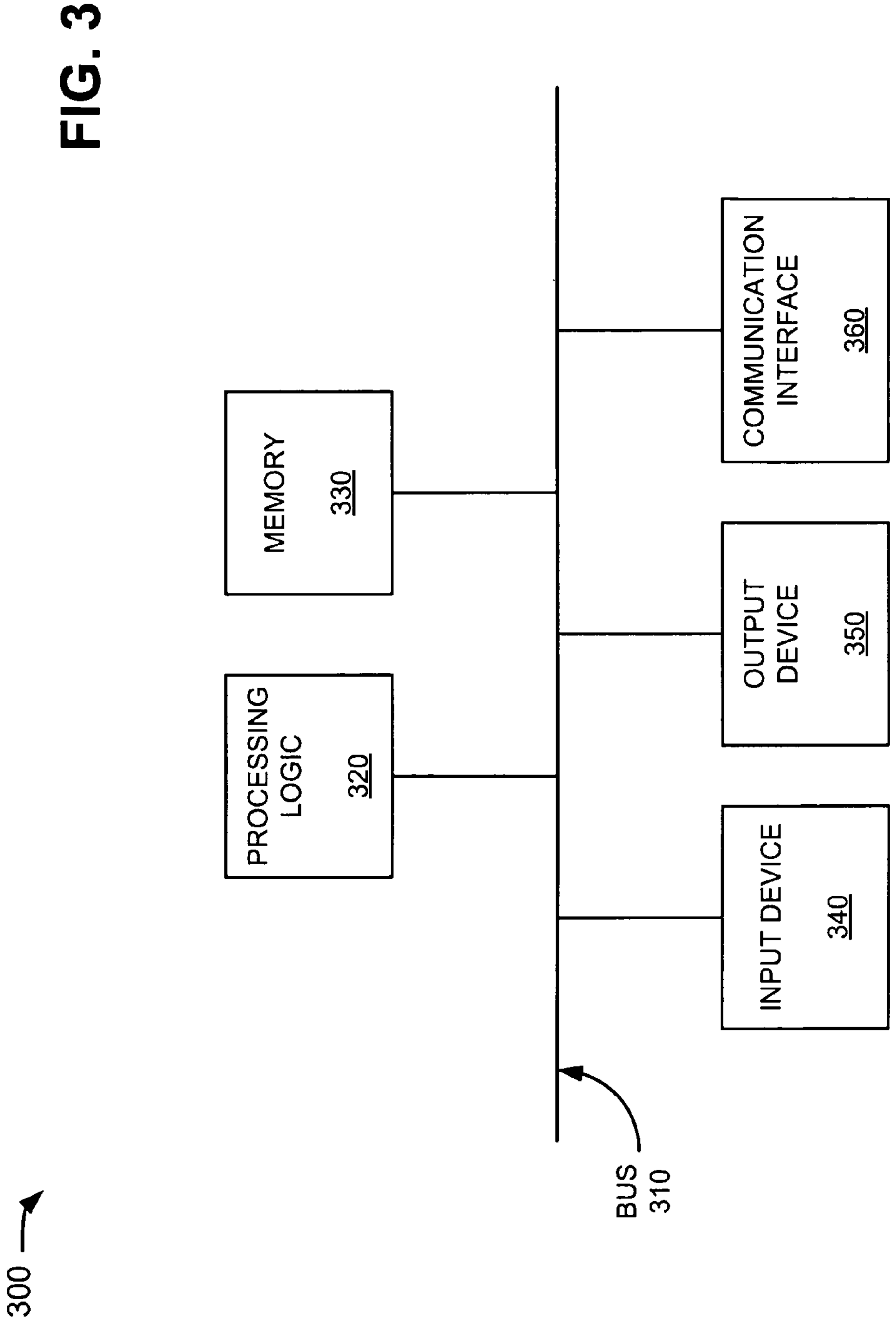
FIG. 3 depicts a diagram of exemplary components of a set-top box (STB) of the network illustrated in FIG. 1.

FIG. 3 depicts a diagram of exemplary components of a device 300 that may correspond to STB 120. As illustrated, device 300 may include a bus 310, processing logic 320, a memory 330, an input device 340, an output device 350, and a communication interface 360.

Bus 310 may include a path that permits communication among the components of device 300. Processing logic 320 may include one or more processors, microprocessors, or other types of processing logic, such as application specific integrated circuits (ASICs), field programmable gate arrays (FPGAs), etc., that may interpret and execute instructions. Memory 330 may include a RAM or another type of dynamic storage device that may store information and instructions for execution by processing logic 320, a ROM or another type of static storage device that may store static information and instructions for use by processing logic 320, and/or another type of storage device.

Input device 340 may include a mechanism that permits an operator to input information to device 300, such as buttons or a touch-screen interface. Output device 350 may include a mechanism that outputs information to the operator, such as a display. Communication interface 360 may include any transceiver-like mechanism that enables device 300 to receive and/or send information from/to other devices and/or systems, such as display 110, remote control 130, server 140, one or more entertainment components (e.g., a speaker, a video recorder, etc.), etc.

Device 300 may perform certain operations relating to providing on screen diagnostics. Device 300 may perform these, and other operations, in response to processing logic 320 executing software instructions contained in a computer-readable medium, such as memory 330. The software instructions may be read into memory 330 from another computer-readable medium or from another device via communication interface 360. The software instructions contained in memory 330 may cause processing logic 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may contain fewer, different, differently arranged, or additional components than depicted in FIG. 3. In still other implementations, one or more components of device 300 may perform one or more other tasks described as being performed by one or more other components of device 300.

Figure 4:
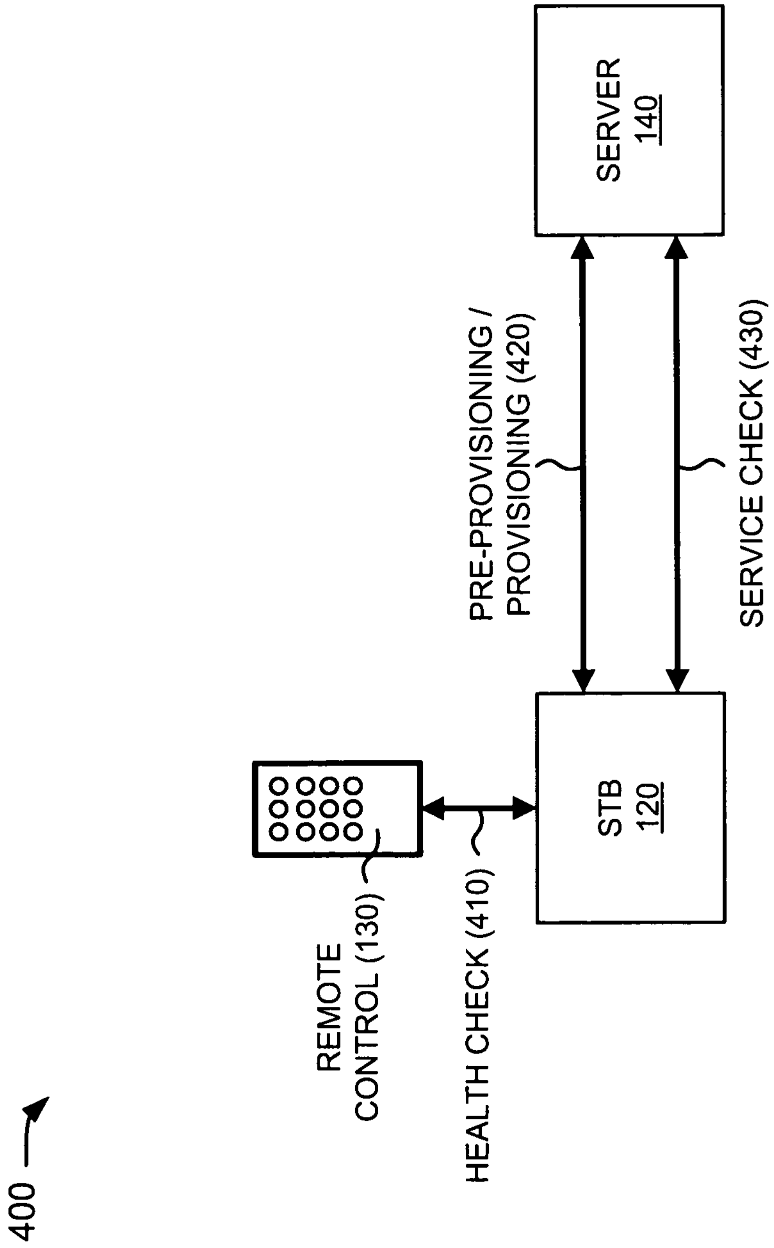
FIG. 4 illustrates a diagram of exemplary operations capable of being performed by an exemplary portion of the network depicted in FIG. 1.

FIG. 4 illustrates a diagram of exemplary operations capable of being performed by an exemplary portion 400 of network 100. As illustrated, exemplary network portion 400 may include STB 120, remote control 130, and server 140. STB 120, remote control 130, and server 140 may include the features described above in connection with, for example, FIG. 1.

After activating STB 120 (e.g., turning on STB 120) and prior to installing STB 120 (e.g., prior to connecting STB 120 with server 140), a health check 410 of STB 120 may be initiated with, for example, remote control 130. Health check 410 may automatically check radio frequencies associated with STB 120. For example, in one implementation, health check 410 may automatically check an Internet protocol (IP)/Ethernet connection and/or an out-of-band (OOB) channel associated with STB 120. STB 120 may rely on the OOB channel to transmit control messaging from a cable head-end to STB 120. Conditional access (CA), system information (SI), electronic program guide (EPG), emergency alert system (EAS), and other commands and control messages may be sent via the OOB channel, which is separate from channels that may actually be watched. STB 120 may receive content for the OOB channel over the IP/Ethernet connection.

After health check 410 is performed and STB 120 is connected to server 140, pre-provisioning and provisioning (pre-provisioning/provisioning) 420 of STB 120 may be performed. Pre-provisioning/provisioning 420 may automatically perform pre-provisioning operations associated with STB 120. For example, in one implementation, pre-provisioning/provisioning 420 may include STB 120 automatically sending an initialization (INIT) message to server 140. Server 140 may initialize STB 120 (e.g., may send a channel map, codes, etc. to STB 120) based on the INIT message. Once STB 120 is initialized, pre-provisioning/provisioning 420 may automatically perform provisioning operations associated with STB 120. For example, in another implementation, pre-provisioning/provisioning 420 may include STB 120 automatically sending an activation message to server 140. Server 140 may activate STB 120 (e.g., may send program entitlements to STB 120) based on the activation message.

After pre-provisioning/provisioning 420 is performed, a service check 430 of STB 120 may be performed. Service check 430 may automatically perform checks of services associated with STB 120. For example, service check 430 may include STB 120 automatically checking EPG, VOD, DVR, program entitlements, etc. associated with STB 120 (e.g., via interaction with server 140).

In one exemplary implementation, STB 120 may provide information associated with health check 410, pre-provisioning/provisioning 420, and/or service check 430 on display 110. For example, STB 120 may provide one or more user interfaces (e.g., on screen diagnostics) on display 110 that may enable a user (e.g., associated with STB 120) to view information associated with health check 410, pre-provisioning/provisioning 420, and/or service check 430 (e.g., each step of the automatic provisioning of STB 120). Further details of on screen diagnostic user interfaces are provided below in connection with, for example, FIGS. 8-22.

Although FIG. 4 shows exemplary components of network portion 400, in other implementations, network portion 400 may contain fewer, different, differently arranged, or additional components than depicted in FIG. 4. In still other implementations, one or more components of network portion 400 may perform one or more other tasks described as being performed by one or more other components of network portion 400. In one example, if multiple STBs 120 are being replaced and/or installed at a customer's premises, the multiple STBs 120 may provide installation states to an application (e.g., a "Tech Wizard") provided by server 140 for centralized monitoring of the customer's premises.

Figure 5:
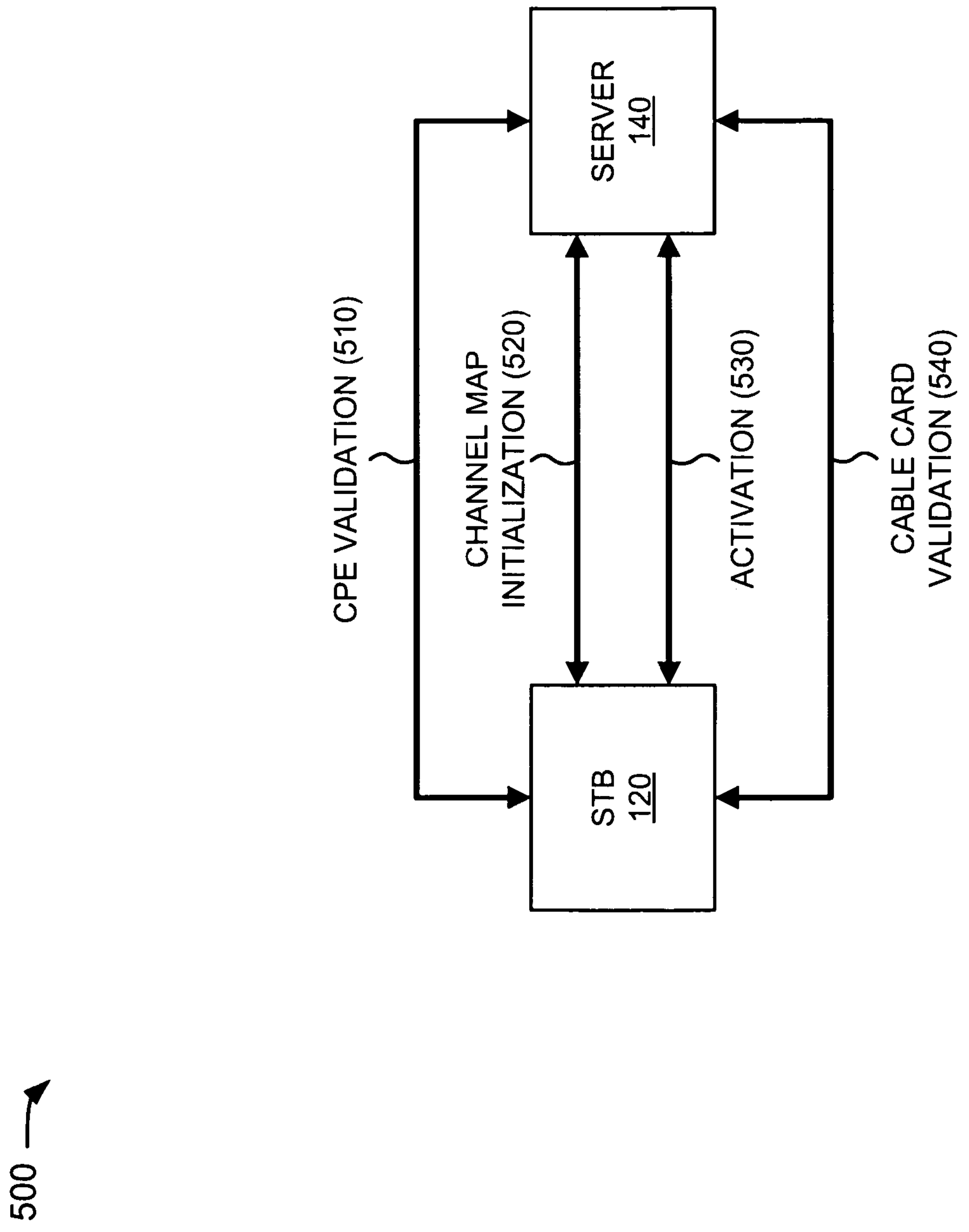
FIG. 5 depicts a diagram of exemplary pre-provisioning and/or provisioning operations capable of being performed by an exemplary portion of the network illustrated in FIG. 1.

FIG. 5 depicts a diagram of exemplary pre-provisioning and/or provisioning operations (e.g., pre-provisioning/provisioning 420) capable of being performed by an exemplary portion 500 of network 100. As illustrated, exemplary network portion 500 may include STB 120 and server 140. STB 120 and server 140 may include the features described above in connection with, for example, FIGS. 1 and 4.

As further shown in FIG. 5, STB 120 and/or server 140 may automatically validate customer premises equipment (CPE), as indicated by reference number 510. CPE may include any equipment (e.g., a television, a DVR, STB 120, etc.) provided at the premises of a customer and associated with STB 120. In one example, CPE validation 510 may ensure that STB 120 is not stolen. In one exemplary implementation, server 140 may receive information associated with STB 120 (e.g., and other CPE), such as serial numbers, identification numbers, etc. Server 140 may compare the received information to valid information (e.g., valid serial numbers, identification numbers, etc.) contained in a database associated with server 140, and may validate the CPE based on the comparison.

After CPE validation 510, STB 120 (e.g., via server 140) may automatically initialize a channel map associated with STB 120, as indicated by reference number 520. A channel map may include a listing of channels and/or channel information provided by, for example, an EPG. In one implementation, channel map initialization 520 may include STB 120 automatically sending an initialization (INIT) message to server 140. Server 140 may initialize STB 120 and may send a channel map, codes associated with the channel map, etc. to STB 120 based on the INIT message.

After channel map initialization 520, STB 120 (e.g., via server 140) may automatically activate STB 120, as indicated by reference number 530. In one implementation, activation 530 may include STB 120 automatically sending an activation message to server 140. Server 140 may activate STB 120 based on the activation message. For example, server 140 may send program entitlements to STB 120 based on the activation message. Program entitlements may include television programming permitted for STB 120 (e.g., determined based on a type of television package ordered by a customer, a cost of the television package, etc.).

After activation 530, STB 120 (e.g., via server 140) may automatically validate any cable cards associated with STB 120, as indicated by reference number 540. A cable card may include an interface for a cable line (e.g., a digital cable line). In one example, cable card validation 540 may ensure that any cable cards associated with STB 120 are not stolen. In one exemplary implementation, server 140 may receive information (e.g., from STB 120) associated with the cable cards, such as serial numbers, identification numbers, etc. Server 140 may compare the received information to valid information (e.g., valid serial numbers, identification numbers, etc.) contained in a database associated with server 140, and may validate the cable cards based on the comparison.

Although FIG. 5 shows exemplary components of network portion 500, in other implementations, network portion 500 may contain fewer, different, differently arranged, or additional components than depicted in FIG. 5. In still other implementations, one or more components of network portion 500 may perform one or more other tasks described as being performed by one or more other components of network portion 500.

Figure 6:
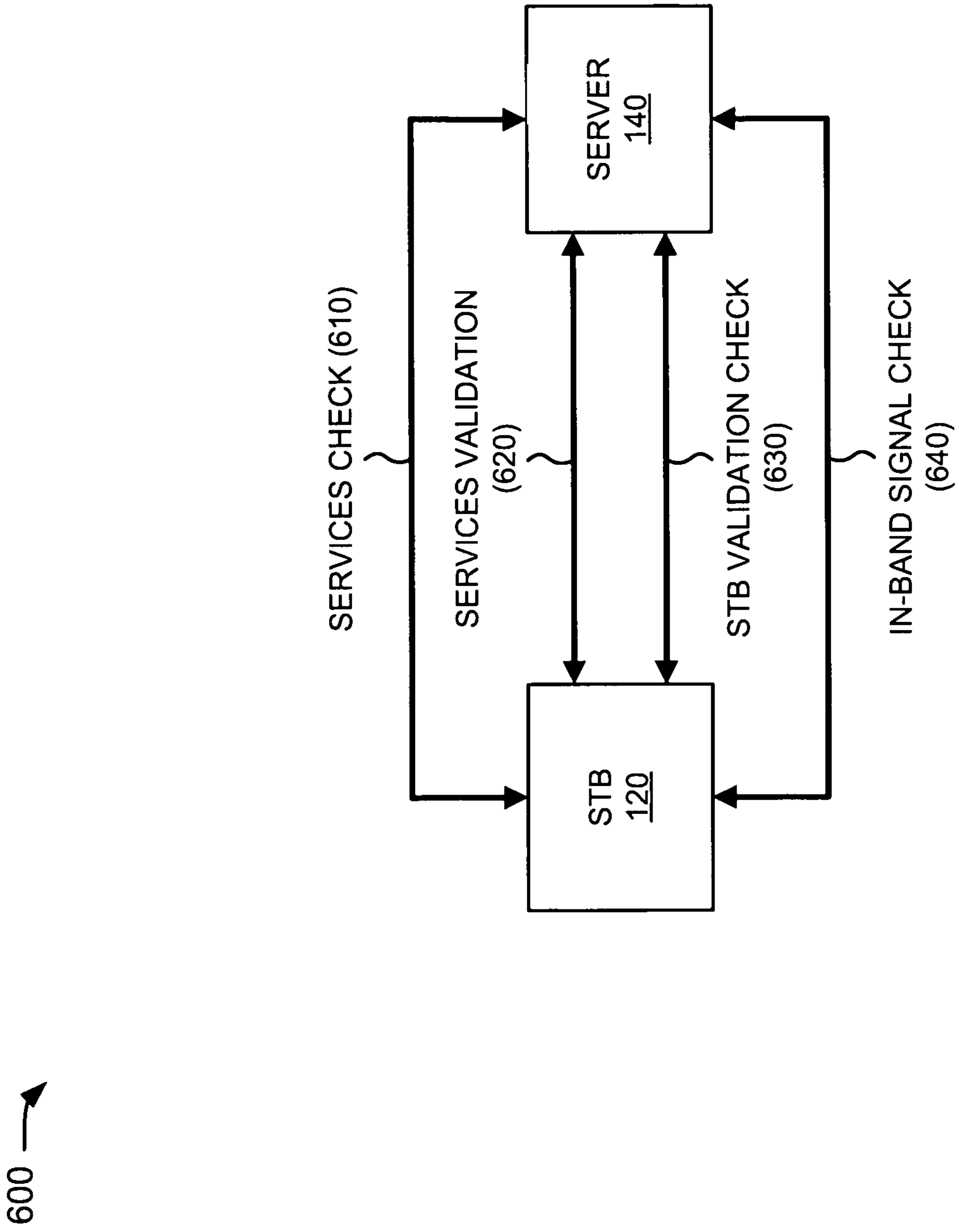
FIG. 6 illustrates a diagram of exemplary service check operations capable of being performed by an exemplary portion of the network depicted in FIG. 1.

FIG. 6 illustrates a diagram of exemplary service check operations capable of being performed by an exemplary portion 600 of network 100. As illustrated, exemplary network portion 600 may include STB 120 and server 140. STB 120 and server 140 may include the features described above in connection with, for example, FIGS. 1, 4, and 5.

As further shown in FIG. 6, STB 120 (e.g., via server 140) may automatically check services associated with STB 120, as indicated by reference number 610. Services associated with STB 120 may include the EPG, VOD services, content search services, program entitlements, widgets, etc. In one implementation, services check 610 may include STB 120 automatically sending a request, to server 140, for available services (e.g., available to STB 120). Server 140 may send the available services to STB 120, and STB 120 may compare the received available services to a list of services (e.g., for which STB 120 should be enabled) provided in a database associated with STB 120. If STB 120 is missing a service to which it should have access, STB 120 may provide an indication of the missing service (e.g., to display 110).

After services check 610, STB 120 (e.g., via server 140) may automatically validate the services associated with STB 120, as indicated by reference number 620. In one implementation, services validation 620 may include STB 120 automatically determining if the services (e.g., the EPG, VOD services, content search services, program entitlements, widgets, etc.) associated with STB 120 are functioning correctly. For example, STB 120 may automatically determine if the VOD services (e.g., provided on a certain channel by server 140) are being properly received by STB 120.

After services validation 620, STB 120 (e.g., via server 140) may automatically check the validation of STB 120, as indicated by reference number 630. In one implementation, STB validation check 630 may include STB 120 tuning to a high value content channel (e.g., a high definition channel) associated with STB 120, and determining if the high value content channel is functioning properly. For example, STB 120 may automatically determine if the high definition services (e.g., provided on a certain channel by server 140) are being properly received by STB 120.

After STB validation check 630, STB 120 (e.g., via server 140) may automatically check in-band signals for one or more channels associated with STB 120, as indicated by reference number 640. In one implementation, in-band signal check 640 may include STB 120 automatically checking in-band signals for three channels (e.g., a low frequency channel, a medium frequency channel, and a high frequency channel) received by STB 120 from server 140.

Although FIG. 6 shows exemplary components of network portion 600, in other implementations, network portion 600 may contain fewer, different, differently arranged, or additional components than depicted in FIG. 6. In still other implementations, one or more components of network portion 600 may perform one or more other tasks described as being performed by one or more other components of network portion 600.

Figure 7:
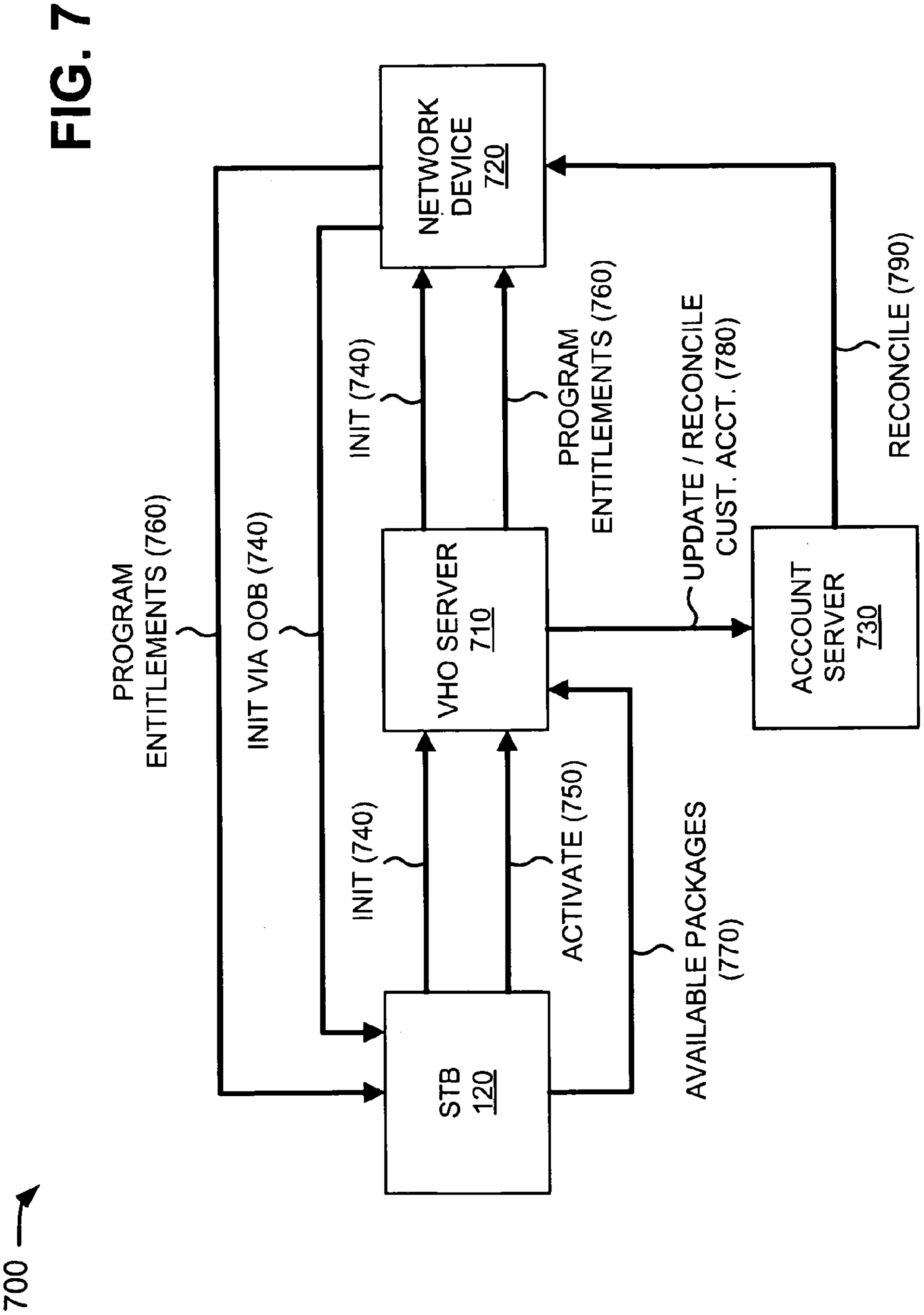
FIG. 7 depicts a diagram of another exemplary network in which systems and/or methods described herein may be implemented.

FIG. 7 depicts a diagram of another exemplary network 700 in which systems and/or methods described herein may be implemented. As illustrated, network 700 may include STB 120, a video hub office (VHO) server 710, a network device 720, and an account server 730 interconnected by a network (not shown). Components of network 700 may interconnect via wired and/or wireless connections. A single STB 120, VHO server 710, network device 720, and account server 730 have been illustrated in FIG. 7 for simplicity. In practice, there may be more STBs 120, VHO servers 710, network devices 720, and/or account servers 730. Also, in some instances, one or more of the components of network 700 may perform one or more functions described as being performed by another one or more of the components of network 700. STB 120 may include the features described above in connection with, for example, FIGS. 1 and 4-6. In one implementation, VHO server 710, network device 720, and/or account server 730 may include the features of server 140 that were described above in connection with, for example, FIGS. 1 and 4-6.

VHO server 710 may include one or more server entities, or other types of computation or communication devices, that gather, process, search, and/or provide information in a manner described herein. In one implementation, VHO server 710 may include a computer, a computer system, an application, a cable head-end, and/or a broadcasting device capable of providing content (e.g., subscription video packages, television programming, movies, on-demand services, live television, etc.) and/or other information to STB 120.

In one exemplary implementation, VHO server 710 may include an on-demand server, a regional content server, an advertisements (ads) server, and an interactive applications server. An on-demand server may provide on-demand services (e.g., music, video, and/or games on-demand). A regional content server may provide free television broadcasts (e.g., local broadcasts, such as NBC, CBS, ABC, and Fox). An ads server may control what advertising content (e.g., commercials) is presented in connection with the national and/or regional video content. An interactive applications server may manage the serving of interactive content. Interactive content may include any form of content with which a user can interact.

Network device 720 may include a digital-to-analog converter (DAC), a data transfer device, such as a gateway, a router, a switch, a firewall, a network interface card (NIC), a hub, a bridge, a proxy server, an optical add-drop multiplexer (OADM), or some other type of device that processes and/or transfers data.

Account server 730 may include one or more server entities, or other types of computation or communication devices, that gather, process, search, and/or provide information in a manner described herein. In one implementation, account server 730 may include a computer, a computer system, and/or an application capable of managing account information associated with customers of STB 120.

As further shown in FIG. 7, after STB 120 performs health check 410, STB 120 may send an initialization (INIT) message 740 to VHO server 710. INIT message 740 may include information (e.g., serial numbers, identification numbers, etc.) associated with STB 120. VHO server 710 may receive may receive (e.g., via INIT message 740) the information associated with STB 120 (e.g., and other CPE), may compare the received information to valid information (e.g., valid serial numbers, identification numbers, etc.) contained in a database associated with VHO server 710, and may validate the CPE based on the comparison. After CPE validation, VHO server 710 may send INIT message 740 to network device 720. Network device 720 may receive INIT message 740, and may forward INIT message 740 to STB 120 via an OOB channel associated with STB 120.

STB 120 may receive INIT message 740 via the OOB channel, and may reset itself based on INIT message 740. After resetting itself, STB 120 may send an activate message 750 to VHO server 710, and VHO server 710 may receive activate message 750. Based on activate message 750, VHO server 710 may send program entitlements 760 (e.g., associated with STB 120) to network device 720. In one implementation, program entitlements 760 may include television programming permitted for STB 120 (e.g., determined based on a type of television package ordered by a customer, a cost of the television package, etc.). Network device 720 may receive program entitlements 760, and may forward program entitlements to STB 120.

As further shown, STB 120 may receive program entitlements 760, and may determine available packages 770 for STB 120 based on program entitlements 760. Available packages 770 may include one or more television packages available to STB 120. STB 120 may inform VHO server 710 of available packages 770, and VHO server 710 may send, to account server 730 and based on available packages 770, update information and a request to reconcile a customer account (e.g., associated with STB 120), as indicated by reference number 780. For example, VHO server 710 provide, to account server 730, information associated with available packages, identification information associated with STB 120, a request to reconcile an account of a customer associated with STB 120, etc. Account server 730 may receive update/reconcile customer account 780 from VHO server 710, and may provide, to network device 720, an indication 790 of reconciliation of the customer's order (e.g., for available packages 770) with the customer's account. Upon receipt of indication 790, STB 120 may be ready for operation.

FIGS. 8-22 illustrate diagrams of exemplary user interfaces capable of being generated by STB 120 and/or server 140 (e.g., and displayed via display 110). The user interfaces depicted in FIGS. 8-22 (collectively referred to as "the user interfaces") may include graphical user interfaces (GUIs) or non-graphical user interfaces, such as text-based interfaces. The user interfaces may provide information to users via customized interfaces (e.g., proprietary interfaces) and/or other types of interfaces (e.g., browser-based interfaces, television interfaces, etc.). The user interfaces may receive user inputs via one or more input devices, may be user-configurable (e.g., a user may change the size of the user interfaces, information displayed in the user interfaces, color schemes used by the user interfaces, positions of text, images, icons, windows, etc., in the user interfaces, etc.), and/or may not be user-configurable. Information associated with the user interfaces depicted in FIGS. 8-22 may be selected by a user of STB 120 (e.g., via remote control 130).

The user interfaces depicted in FIGS. 8-22 may provide on screen diagnostics that may enable users (e.g., associated with STB 120) to obtain diagnostic information regarding the health of STB 120 and to automatically provision STB 120. The on screen diagnostics may include ten or more menu categories (or items), with multiple detailed screens associated with each category (or item), which may provide access to an entire set of diagnostic information associated with STB 120. Access to each category may be dependent upon functionality associated with a model type of STB 120. Menu items that are not applicable to STB's 120 model type may not be represented on the on screen diagnostics menu. Menu numbering for different STB 120 models may remain consistent regardless of missing categories or functions.

The on screen diagnostics may be accessed by powering off STB 120 and selecting an "OK" button associated with STB 120. In other implementations, different techniques for accessing the on screen diagnostics may be used. The on screen diagnostics may be exited by powering off STB 120 and then powering on STB 120. Reporting of diagnostic information by the on screen diagnostics may be dynamic. Furthermore, the look, feel, behavior, and user experience associated with the on screen diagnostics may be consistent for different model types of STB 120.

Figure 8:
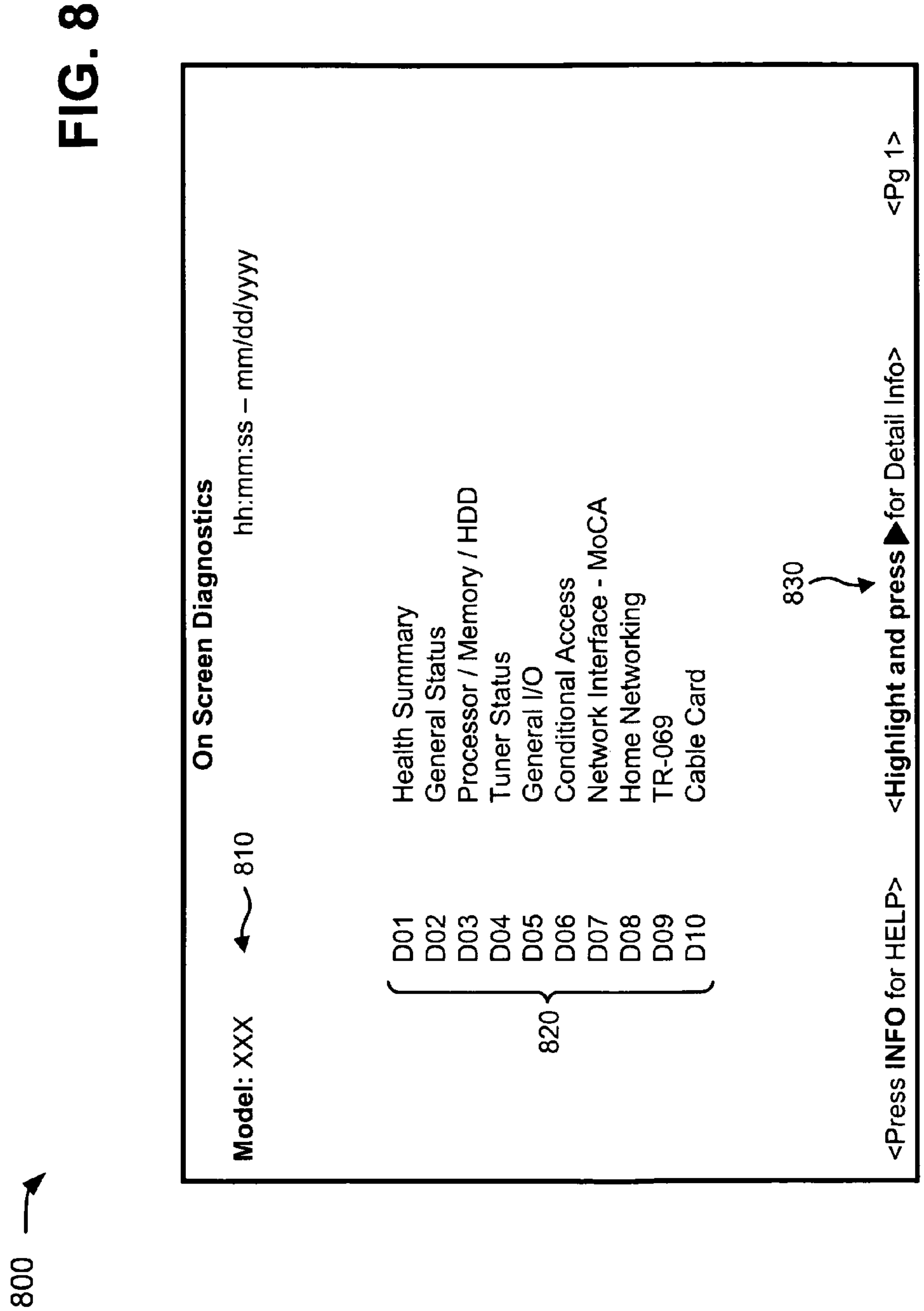

FIG. 8 illustrates a diagram of an exemplary user interface 800 that may correspond to an on screen diagnostics main menu. As shown, user interface 800 may include a STB model identifier 810, a list 820 of items, and instructions 830 for accessing the menu items. STB model identifier 810 may identify a model number (e.g., "XXX") associated with STB 120. List 820 may provide an exemplary list of diagnostic information available for STB 120. For example, list 820 may include a "Health Summary" item (D01), a "General Status" item (D02), a "Processor/Memory/HDD" item (D03), a "Tuner Status" item (D04), a "General I/O" item (D05), a "Conditional Access" item (D06), a "Network Interface-MoCA" item (D07), a "Home Networking" item (D08), a "TR-069" item (D09), and a "Cable Card" item (D10). Instructions 830 may provide instructions (e.g., "Highlight and press ▶ for Detail Info") for accessing items of list 820.

When a user selects item (D01) from list 820, an exemplary user interface 900, as illustrated in FIG. 9, may be provided and may correspond to a health summary item (e.g., "Health Summary" item (D01)). In one implementation, "Health Summary" item (D01) may be available as a separate application from the on screen diagnostics and may be provided by a supplier of STB 120. As shown in FIG. 9, user interface 900 may include a STB model identifier 910, a list 920 of fields, an option 930 for beginning activation, and instructions 940 for accessing the fields. STB model identifier 910 may identify a model number (e.g., "XXX") associated with STB 120. List 920 may provide an exemplary list of fields (e.g., "Cable Status," "Overall Status," etc.) associated with the health of STB 120. Option 930, if selected (e.g., by pressing "OK"), may cause STB 120 to begin activation and provisioning. In one implementation, option 930 may be displayed when "Overall Status" is equal to "Ready." Instructions 940 may provide instructions (e.g., "Highlight and press ▶ for Detail Info") for accessing the fields of list 920.

If STB 120 is not provisioned, "Health Summary" item may execute when STB 120 is powered on. For an IP-enabled STB 120, pressing the "OK" button may initiate automatic provisioning. If STB 120 is provisioned, STB 120 may execute an application, and a key sequence of powering off STB 120 followed by pressing the "OK" (or "Select") button on remote control 130 may invoke the on screen diagnostics menu (FIG. 8). In user interface 900, the user may scroll up and down to highlight a field of list 920, and select "▶—scroll right" for detail information. The user may select "◀—scroll left" to exit the detail screen and return to user interface 900.

FIG. 10 illustrates a diagram of an exemplary user interface 1000 that may correspond to a health summary item (e.g., "Health Summary" item (D01)) for a first in-band tuner (e.g., at low frequency) associated with STB 120. As shown, user interface 1000 may include a STB model identifier 1010 and a list 1020 of information. STB model identifier 1010 may identify a model number (e.g., "XXX") associated with STB 120. List 1020 may provide an exemplary list of diagnostic information (e.g., "Frequency," "Signal Level," "Tuning Mode," "Encrypted," "Result," "Acceptable Range," etc.) available for the first in-band tuner.

Figure 11:
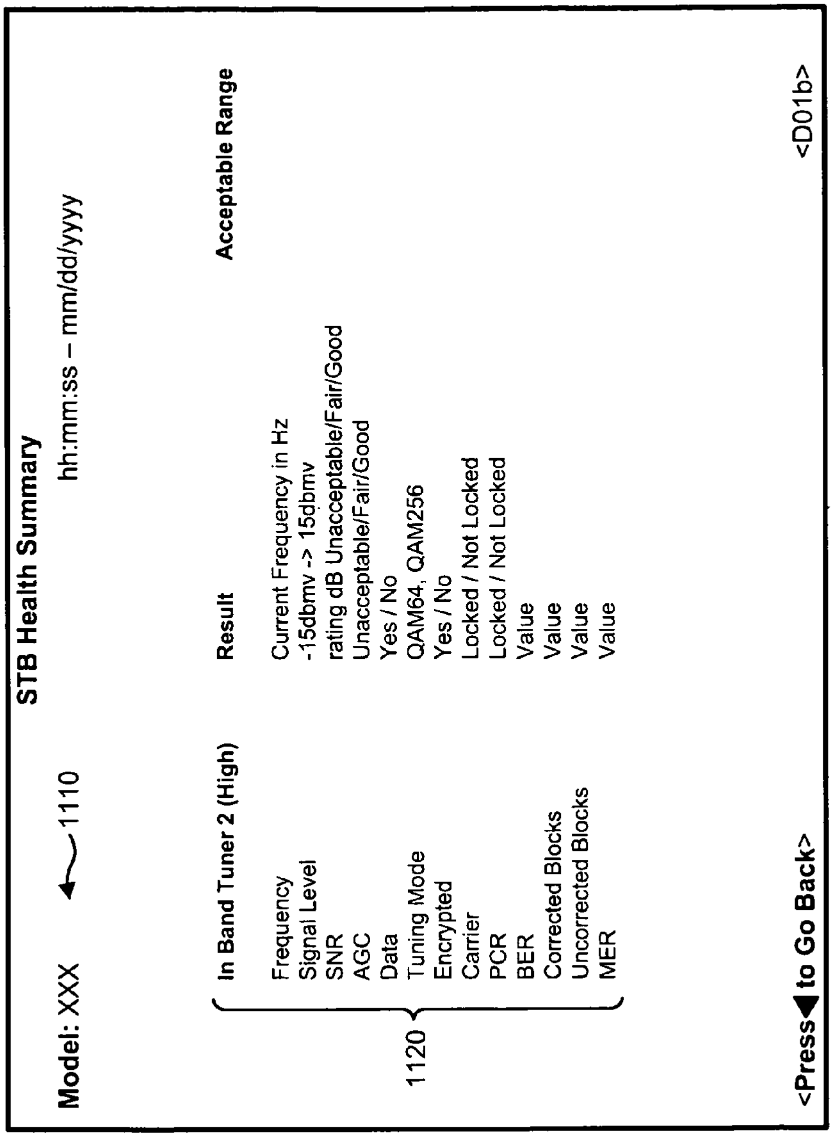

FIG. 11 illustrates a diagram of an exemplary user interface 1100 that may correspond to a health summary item (e.g., "Health Summary" item (D01)) for a second in-band tuner (e.g., at high frequency) associated with STB 120. As shown, user interface 1100 may include a STB model identifier 1110 and a list 1120 of information. STB model identifier 1110 may identify a model number (e.g., "XXX") associated with STB 120. List 1120 may provide an exemplary list of diagnostic information (e.g., "Frequency," "Signal Level," "Tuning Mode," "Encrypted," "Result," "Acceptable Range," etc.) available for the second in-band tuner.

Figure 12:
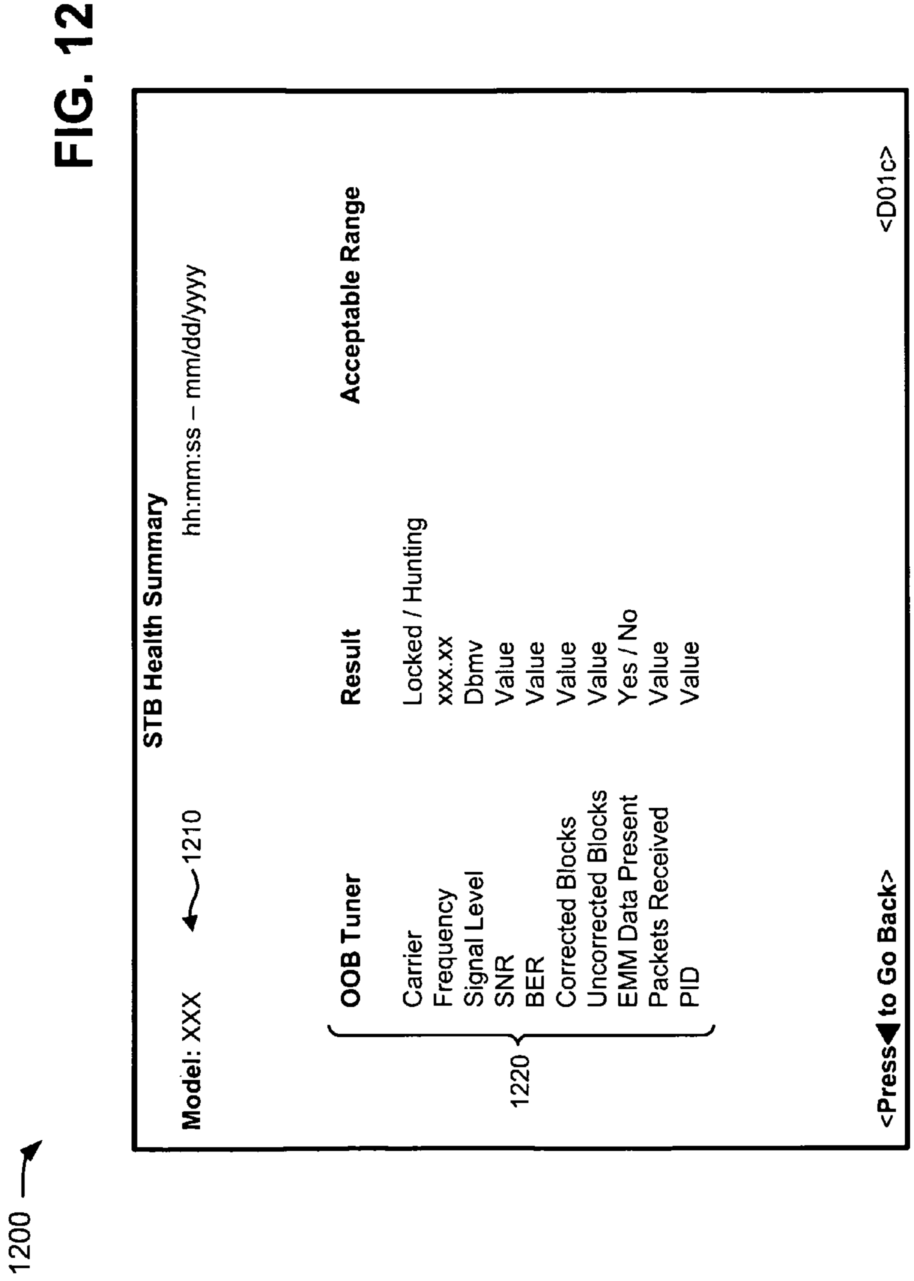

FIG. 12 illustrates a diagram of an exemplary user interface 1200 that may correspond to a health summary item (e.g., "Health Summary" item (D01)) for an OOB tuner associated with STB 120. As shown, user interface 1200 may include a STB model identifier 1210 and a list 1220 of information. STB model identifier 1210 may identify a model number (e.g., "XXX") associated with STB 120. List 1220 may provide an exemplary list of diagnostic information (e.g., "Carrier," "Frequency," "Signal Level," "Result," "Acceptable Range," etc.) available for the OOB tuner.

Figure 13:
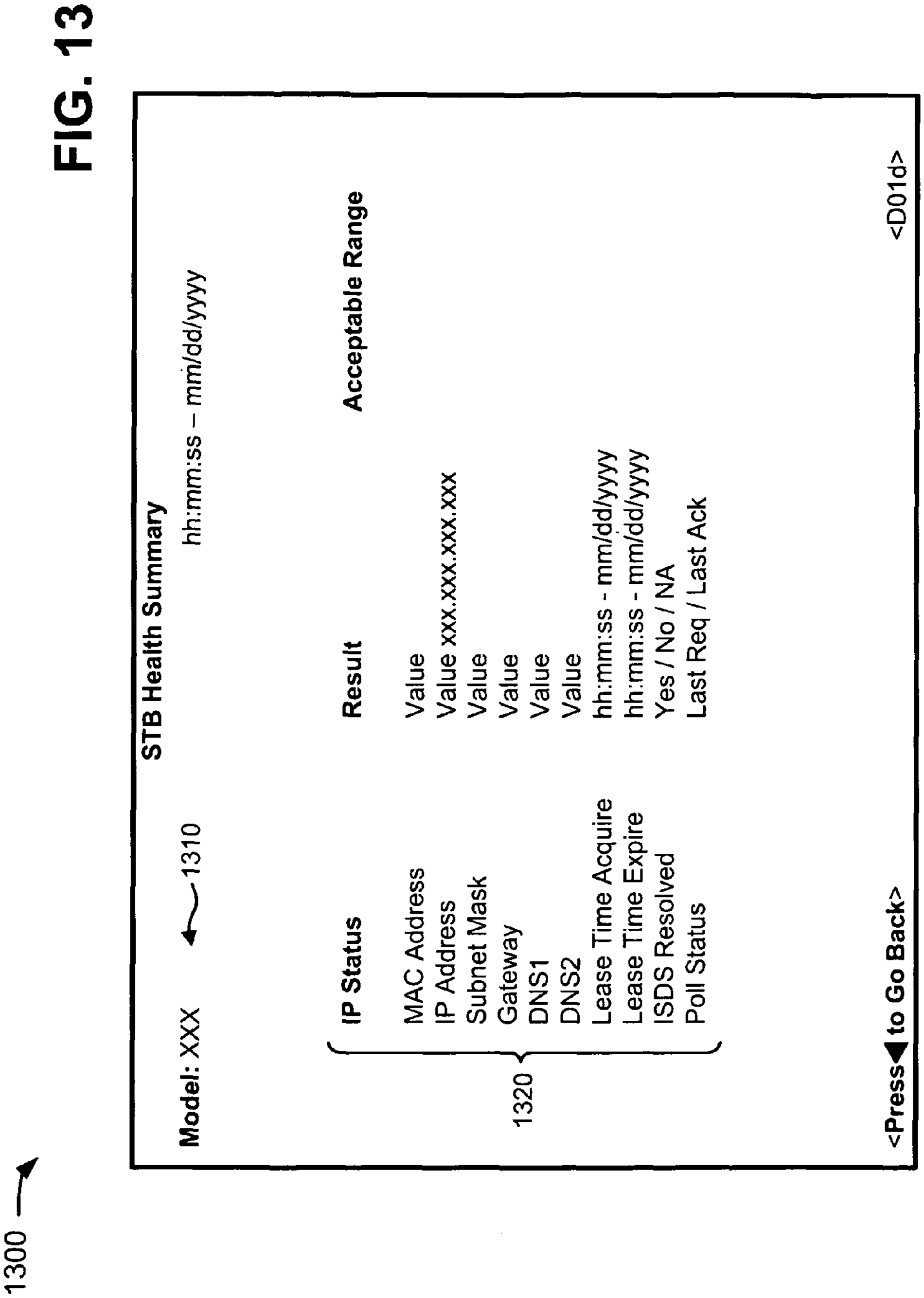

FIG. 13 illustrates a diagram of an exemplary user interface 1300 that may correspond to a health summary item (e.g., "Health Summary" item (D01)) for an IP status associated with STB 120. As shown, user interface 1300 may include a STB model identifier 1310 and a list 1320 of information. STB model identifier 1310 may identify a model number (e.g., "XXX") associated with STB 120. List 1320 may provide an exemplary list of diagnostic information (e.g., "MAC Address," "IP Address," "Gateway," "Result," "Acceptable Range," etc.) available for the IP status.

FIG. 14 illustrates a diagram of an exemplary user interface 1400 that may correspond to a health summary item (e.g., "Health Summary" item (D01)) for a Multimedia over Coax Alliance (MOCA) status associated with STB 120. As shown, user interface 1400 may include a STB model identifier 1410 and a list 1420 of information. STB model identifier 1410 may identify a model number (e.g., "XXX") associated with STB 120. List 1420 may provide an exemplary list of diagnostic information (e.g., "Link State," "Interface," "MAC Address," "IP Address," "Result," "Acceptable Range," etc.) available for the MoCA status.

Figure 15:
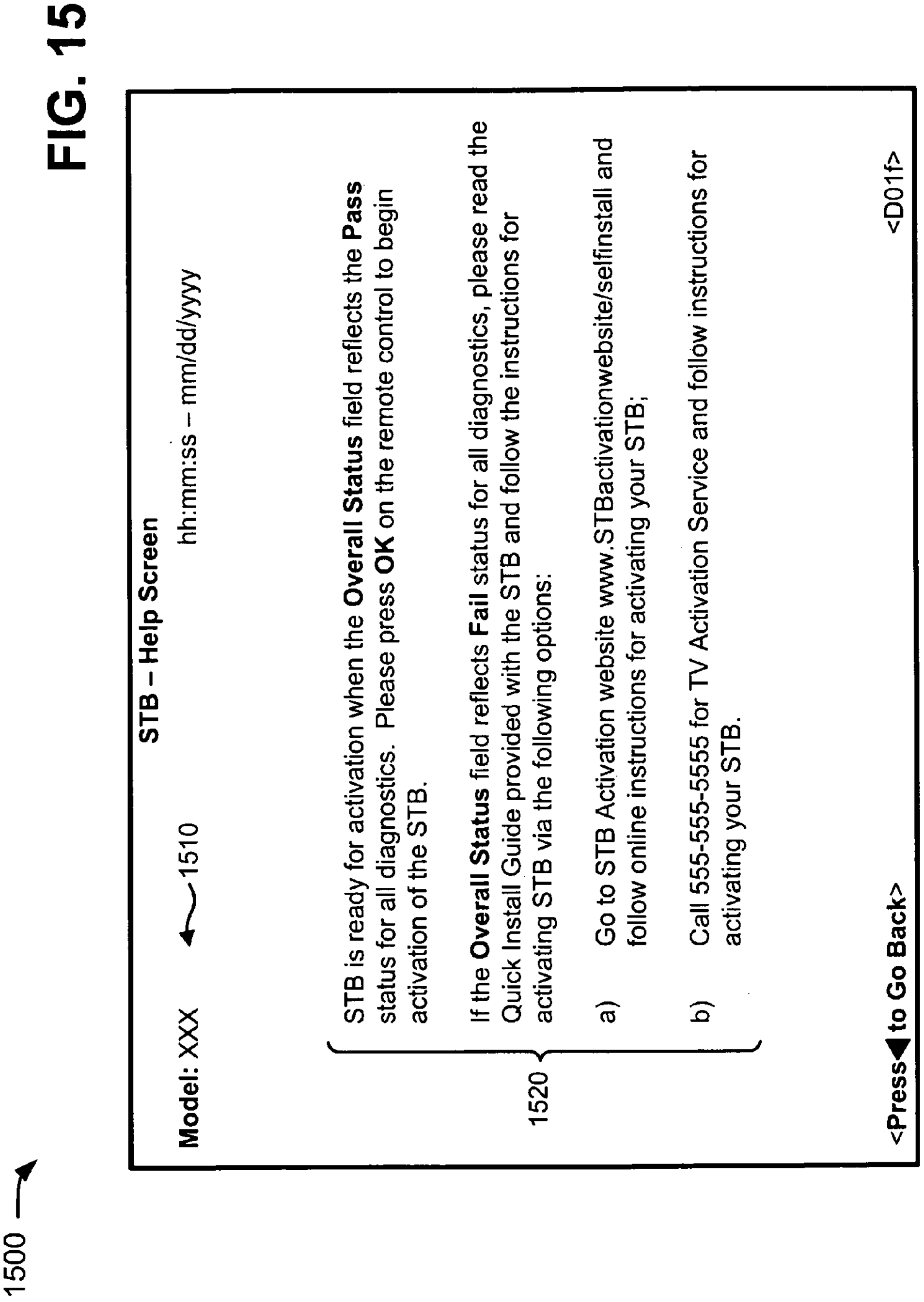

FIG. 15 illustrates a diagram of an exemplary user interface 1500 that may correspond to a help screen for a health summary item (e.g., "Health Summary" item (D01)). As shown, user interface 1500 may include a STB model identifier 1510 and help information 1520. STB model identifier 1510 may identify a model number (e.g., "XXX") associated with STB 120. Help information 1520 may provide help information associated with activation of STB 120 (e.g., "STB is ready for activation when the Overall Status field reflects the Pass status for all diagnostics.").

Figure 16:
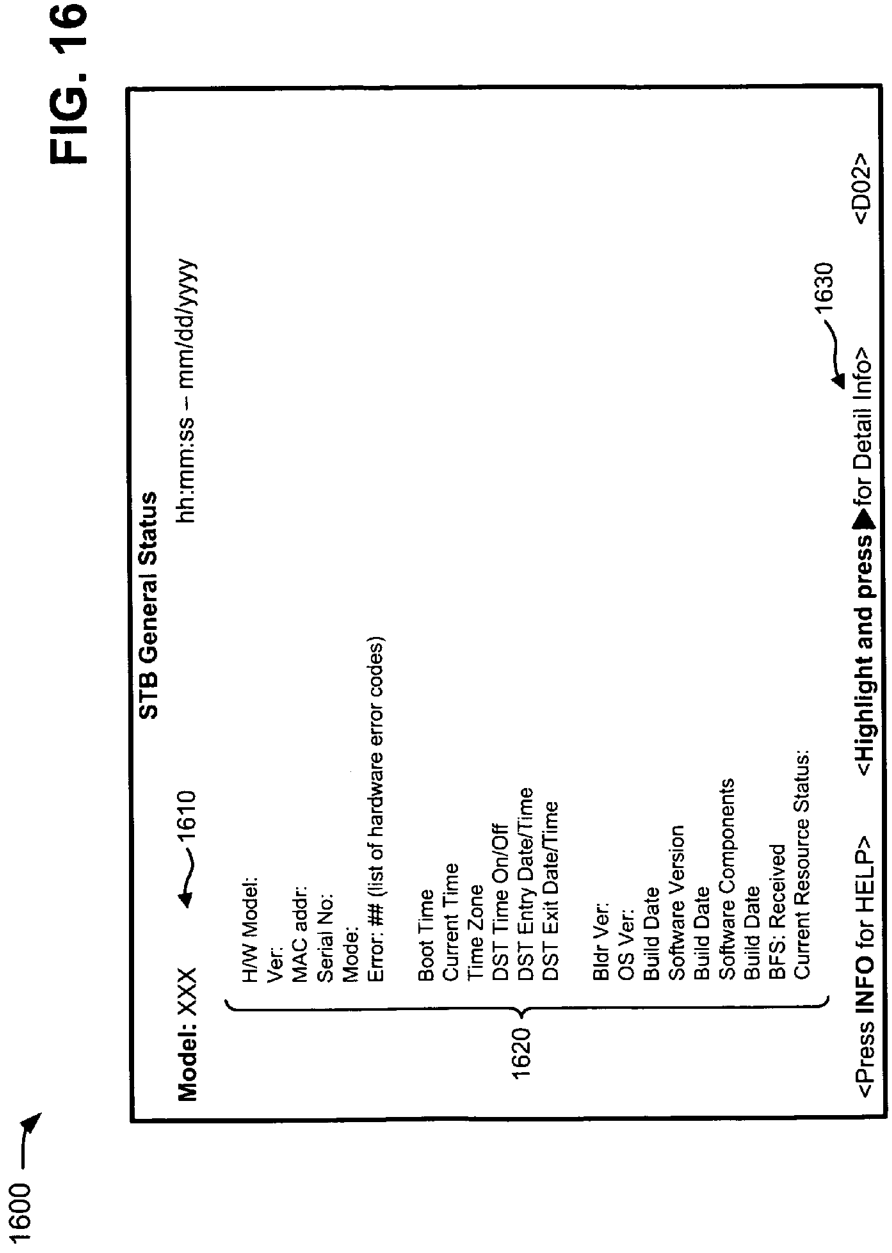

When a user selects item (D02) from list 820, an exemplary user interface 1600, as illustrated in FIG. 16, may be provided and may correspond to a general status item (e.g., "General Status" item (D02)). As shown, user interface 1600 may include a STB model identifier 1610, a list 1620 of fields, and instructions 1630 for accessing the fields. STB model identifier 1610 may identify a model number (e.g., "XXX") associated with STB 120. List 1620 may provide an exemplary list of fields (e.g., "H/W Model," "MAC addr," "Serial No.," etc.) associated with the general status of STB 120. Instructions 1630 may provide instructions (e.g., "Highlight and press ▶ for Detail Info") for accessing the fields of list 1620.

Figure 17:
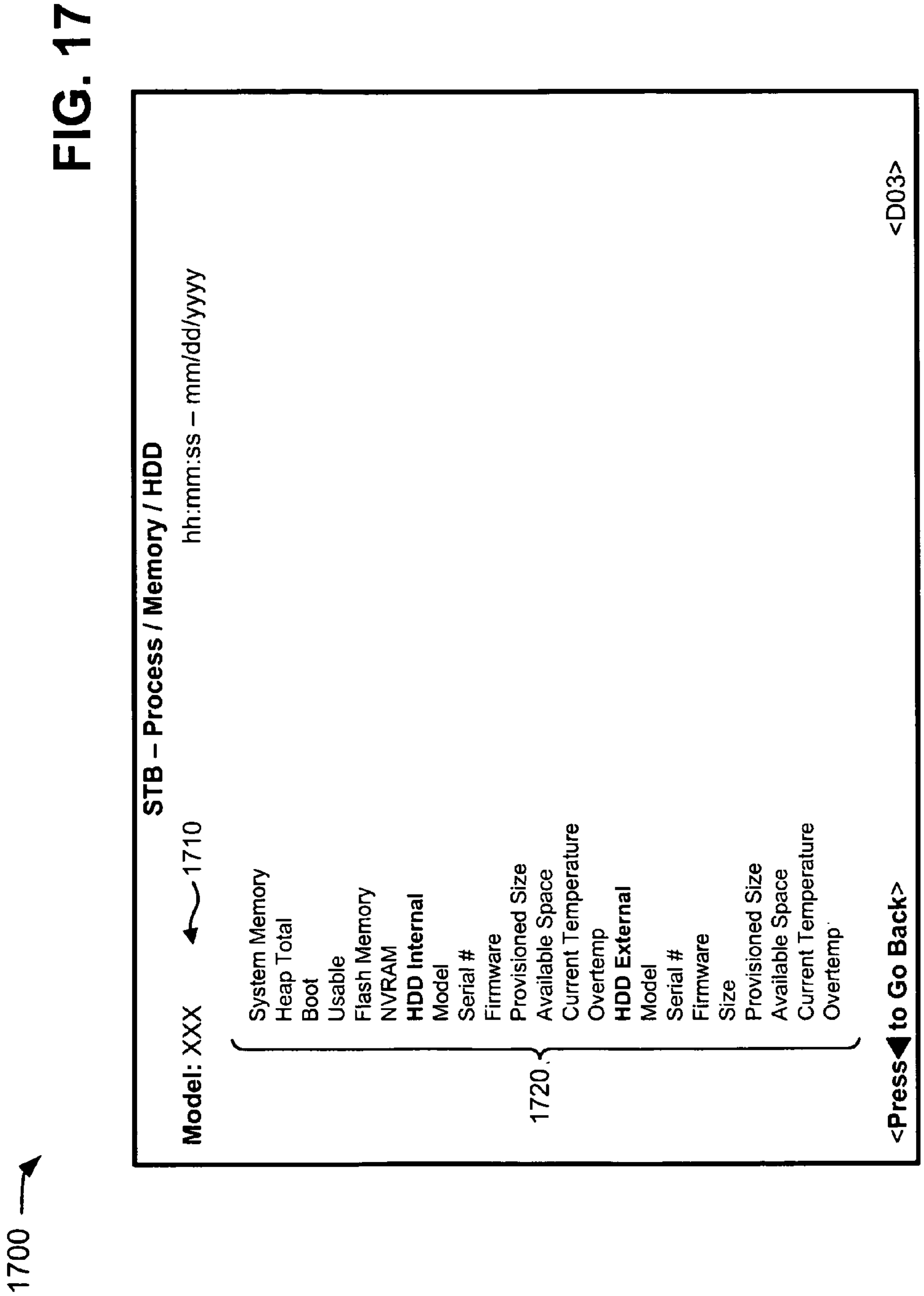

When a user selects item (D03) from list 820, an exemplary user interface 1700, as illustrated in FIG. 17, may be provided and may correspond to a processor/memory/hard drive (HDD) item (e.g., "Processor/Memory/HDD" item (D03)). As shown, user interface 1700 may include a STB model identifier 1710 and a list 1720 of fields. STB model identifier 1710 may identify a model number (e.g., "XXX") associated with STB 120. List 1720 may provide an exemplary list of fields (e.g., "System Memory," "Flash Memory," "Model," "Serial #," etc.) associated with a processor, a memory, and/or a hard drive of STB 120.

Figure 18:
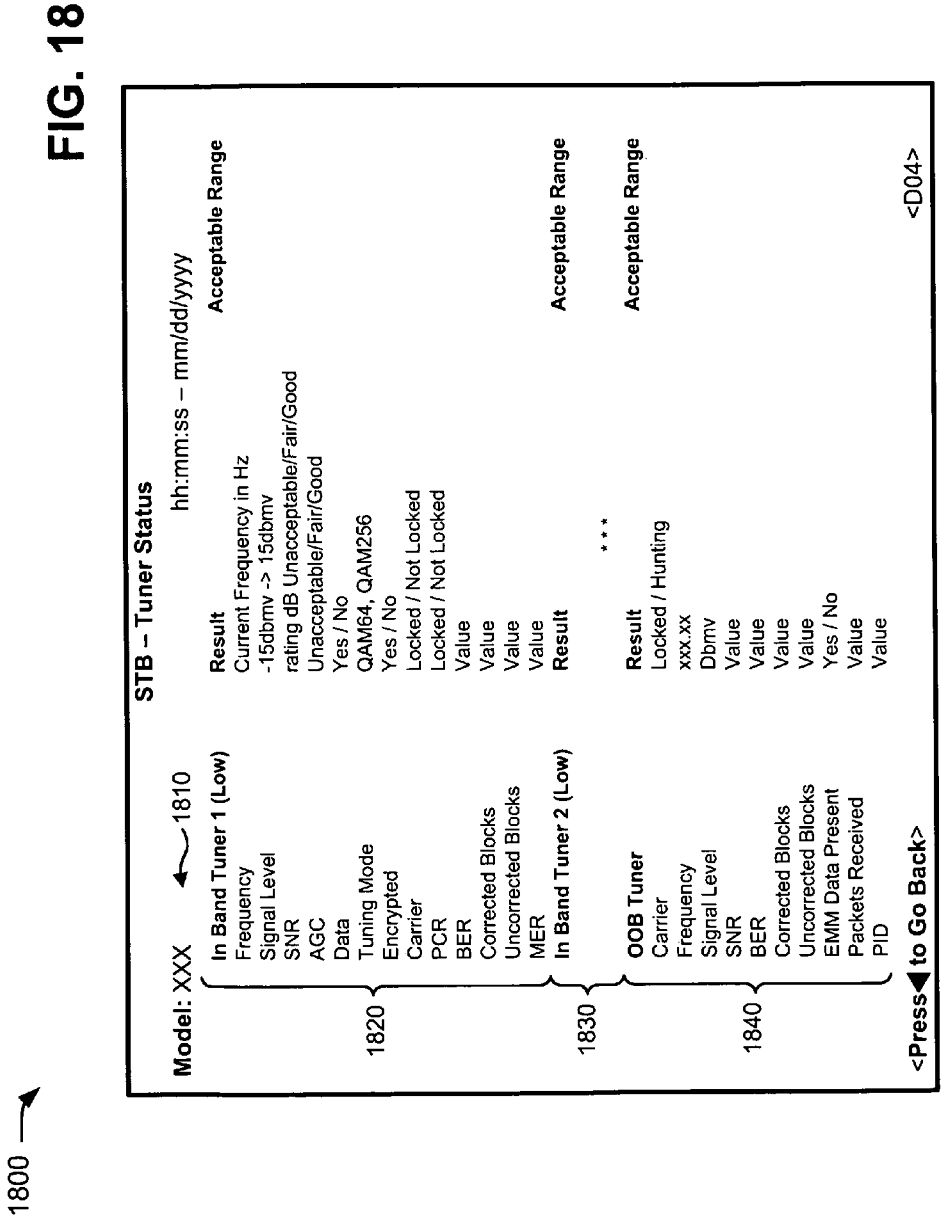

When a user selects item (D04) from list 820, an exemplary user interface 1800, as illustrated in FIG. 18, may be provided and may correspond to a tuner status item (e.g., "Tuner Status" item (D04)). As shown, user interface 1800 may include a STB model identifier 1810, a first list 1820 of fields, a second list 1830 of fields, and a third list 1840 of fields. STB model identifier 1810 may identify a model number (e.g., "XXX") associated with STB 120. First list 1820 may provide an exemplary list of fields (e.g., "Frequency," "Signal Level," "Data," "Tuning Mode," etc.) associated with a first in-band tuner of STB 120. Second list 1830 may provide an exemplary list of fields associated with a second in-band tuner of STB 120. Third list 1830 may provide an exemplary list of fields (e.g., "Carrier," "Frequency," "Signal Level," "Packets Received," etc.) associated with an OOB tuner of STB 120.

Figure 19:
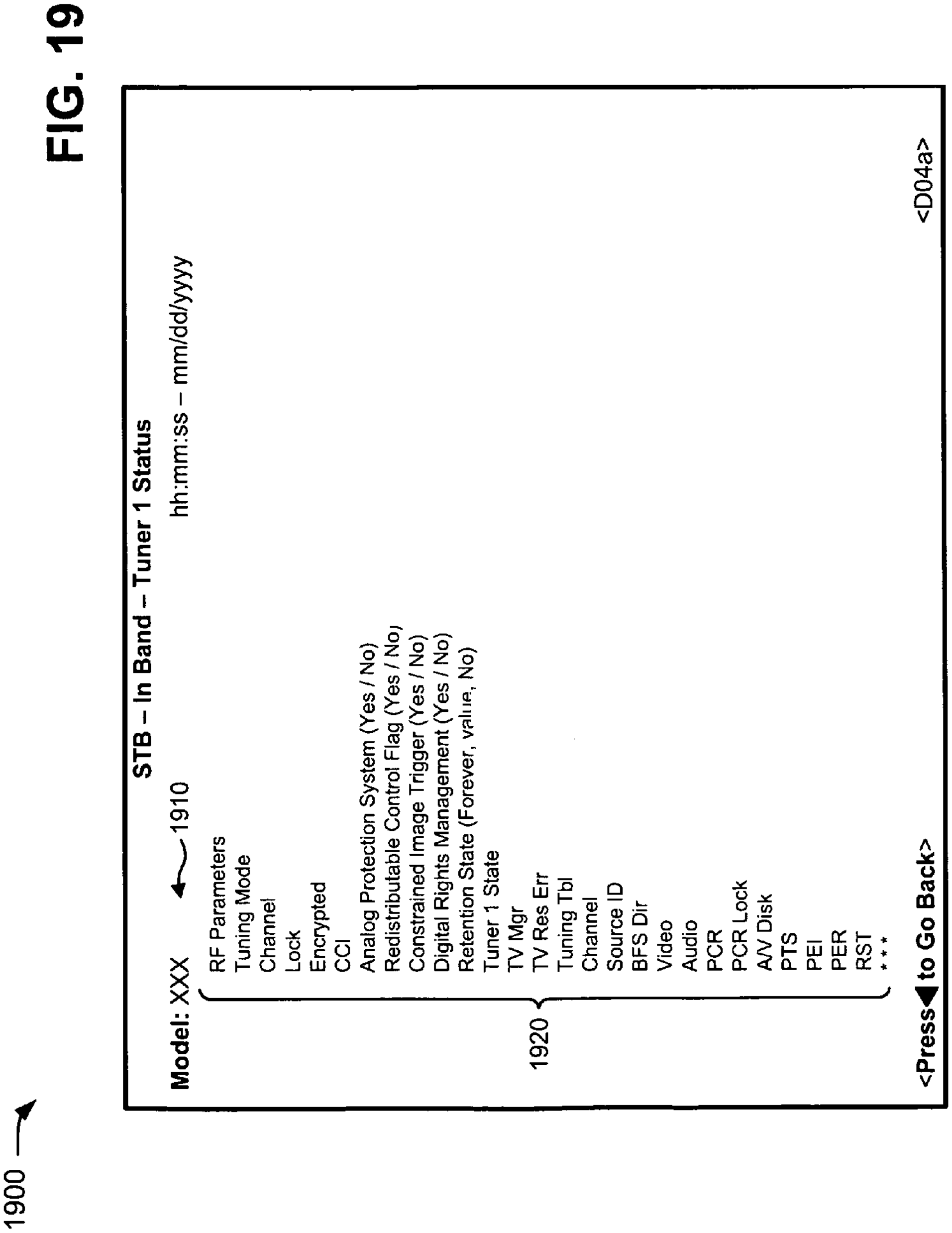

FIG. 19 illustrates a diagram of an exemplary user interface 1900 that may correspond to a tuner status item (e.g., "Tuner Status" item (D04)) for a first in-band tuner associated with STB 120. As shown, user interface 1900 may include a STB model identifier 1910 and a list 1920 of information. STB model identifier 1910 may identify a model number (e.g., "XXX") associated with STB 120. List 1920 may provide an exemplary list of diagnostic information (e.g., "RF Parameters," "Tuning Mode," "Channel," "Encrypted," "Retention State," "Tuner 1 State," etc.) available for the first in-band tuner.

Figure 20:
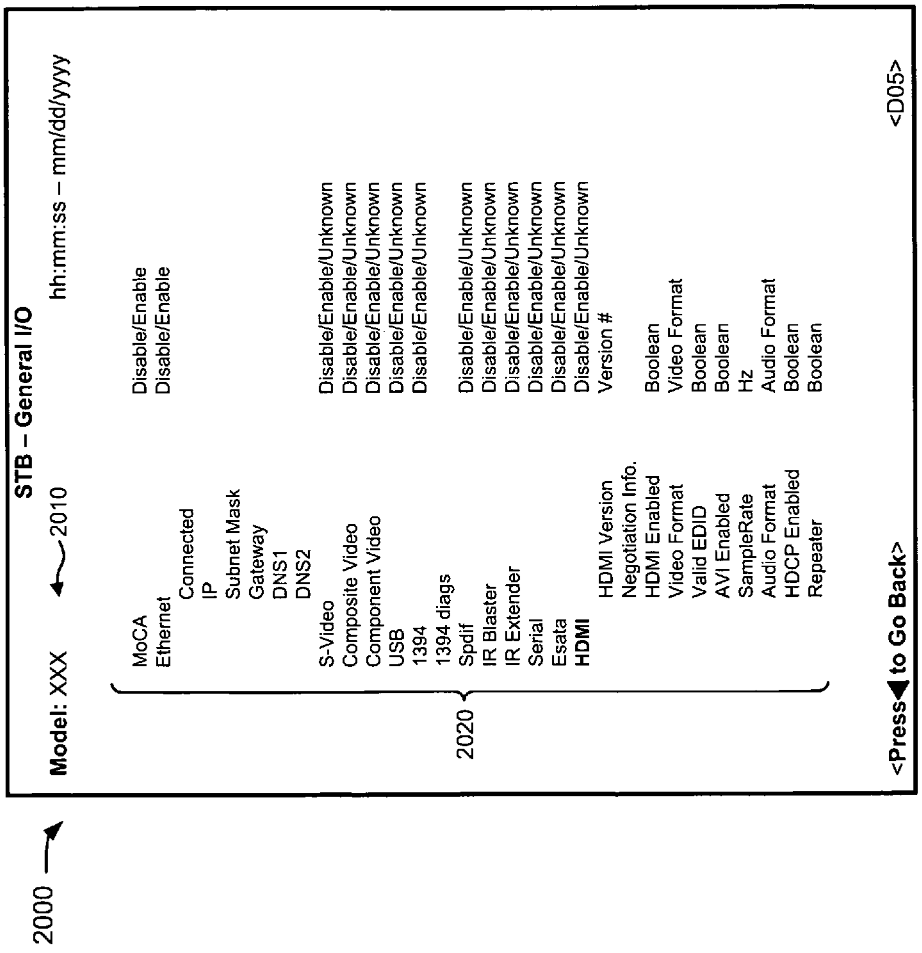

When a user selects item (D05) from list 820, an exemplary user interface 2000, as illustrated in FIG. 20, may be provided and may correspond to a general I/O item (e.g., "General I/O" item (D05)). As shown, user interface 2000 may include a STB model identifier 2010 and a list 2020 of fields. STB model identifier 2010 may identify a model number (e.g., "XXX") associated with STB 120. List 2020 may provide an exemplary list of fields (e.g., "MoCA," "Ethernet," "S-Video," "Composite Video," etc.) associated with general I/O devices of STB 120.

When a user selects item (D06) from list 820, an exemplary user interface 2100, as illustrated in FIG. 21, may be provided and may correspond to a conditional access item (e.g., "Conditional Access" item (D06)). As shown, user interface 2100 may include a STB model identifier 2110 and a list 2120 of fields. STB model identifier 2110 may identify a model number (e.g., "XXX") associated with STB 120. List 2120 may provide an exemplary list of fields (e.g., "pay-per-view (PPV) Credit Limit," "PPV Credit User," "PPV Event Limit," "PPV Event Used," etc.) associated with conditional access of STB 120.

Figure 22:
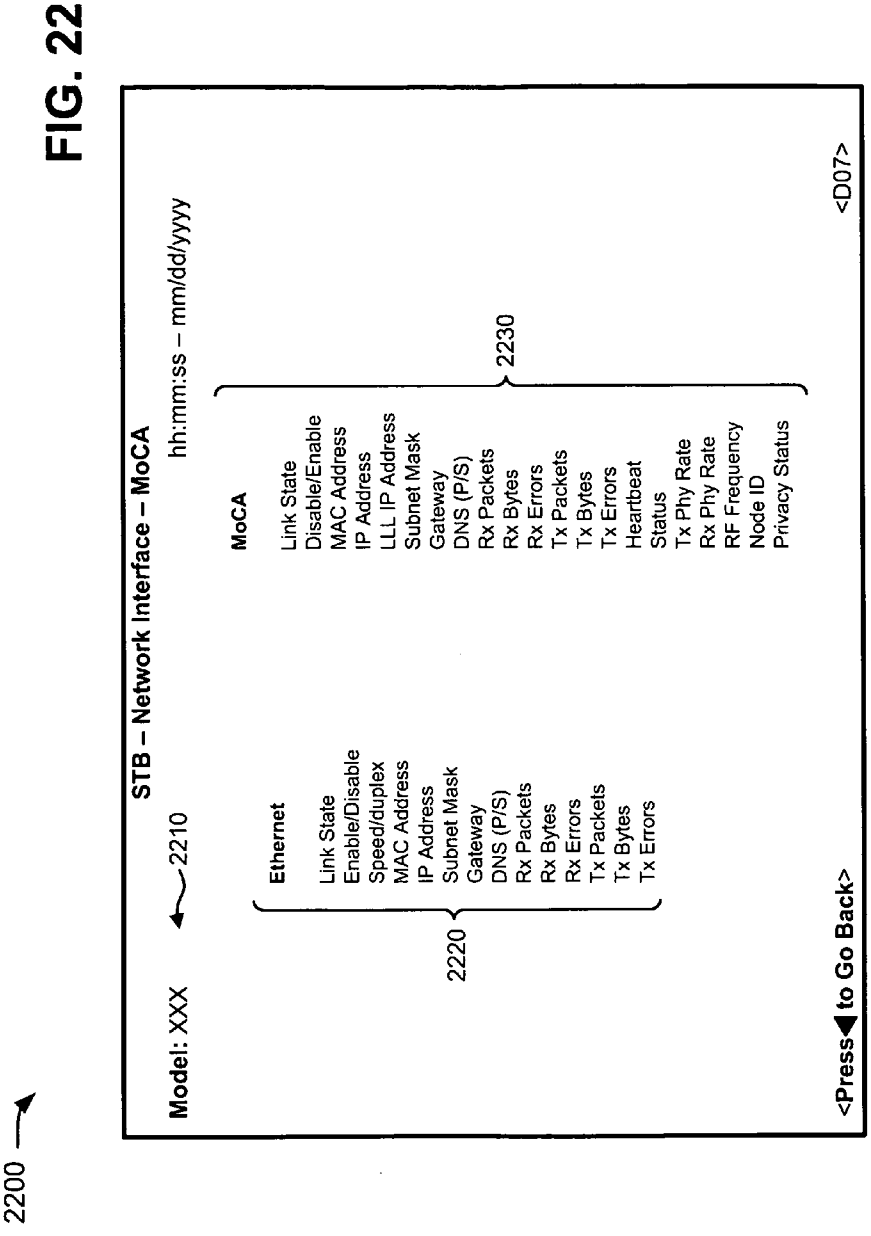

When a user selects item (D07) from list 820, an exemplary user interface 2200, as illustrated in FIG. 22, may be provided and may correspond to a network interface/MoCA item (e.g., "Network Interface-MoCA" item (D07)). As shown, user interface 2200 may include a STB model identifier 2210, a first list 2220 of fields, and a second list 2230 of fields. STB model identifier 2210 may identify a model number (e.g., "XXX") associated with STB 120. First list 2220 may provide an exemplary list of fields (e.g., "Link State," "MAC Address," "IP Address," etc.) associated with an Ethernet network interface of STB 120. Second list 2230 may provide an exemplary list of fields (e.g., "Link State," "MAC Address," "IP Address," etc.) associated with a MoCA network interface of STB 120.

Although user interfaces 800-2200 depict a variety of information, in other implementations, user interfaces 800-2200 may depict fewer, different, differently arranged, or additional information than depicted in FIGS. 8-22. For example, although user interfaces were not depicted for items (D08), (D09), and (D10) of list 820 (FIG. 8), in one implementation, STB 120 and/or server 140 may provide (e.g., via display 110) user interfaces for items (D08), (D09), and/or (D10) that include information similar to the information provided above in connection with FIGS. 8-22.

FIGS. 23-26 illustrate flow charts of an exemplary process 2300 for automatically provisioning a STB (e.g., STB 120) according to implementations described herein. In one implementation, process 2300 may be performed by STB 120. In another implementation, some or all of process 2300 may be performed by another device (e.g., server 140) or group of devices, including or excluding STB 120.

Figure 23:
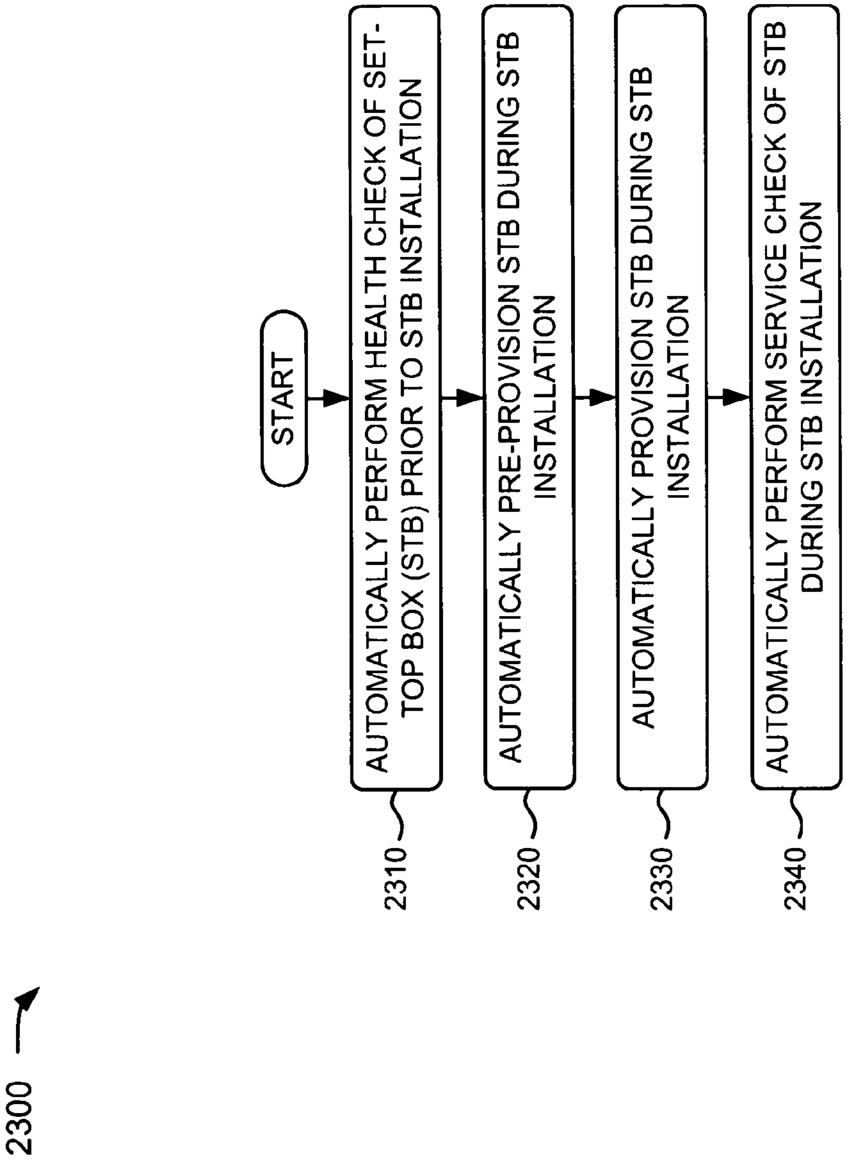
FIGS. 23-26 depict flow charts of an exemplary process for automatically provisioning a STB according to implementations described herein.

As illustrated in FIG. 23, process 2300 may begin with automatically performing a health check of a set-top box (STB) prior to STB installation (block 2310), and automatically pre-provisioning the STB during installation of the STB (block 2320). For example, in implementations described above in connection with FIG. 4, prior to installing STB 120 (e.g., prior to connecting STB 120 with server 140), health check 410 of STB 120 may be initiated with, for example, remote control 130. Health check 410 may automatically check radio frequencies associated with STB 120. In one example, health check 410 may automatically check an Internet protocol (IP)/Ethernet connection and/or an out-of-band (OOB) channel associated with STB 120. After health check 410 is performed and STB 120 is connected to server 140, pre-provisioning/provisioning 420 of STB 120 may be performed. Pre-provisioning/provisioning 420 may automatically perform pre-provisioning operations associated with STB 120. In one example, pre-provisioning/provisioning 420 may include STB 120 automatically sending an initialization (INIT) message to server 140. Server 140 may initialize STB 120 (e.g., may send a channel map, codes, etc. to STB 120) based on the INIT message.

As further shown in FIG. 23, the STB may be automatically provisioned during installation of the STB (block 2330), and a service check of the STB may be automatically performed during installation of the STB (block 2340). For example, in implementations described above in connection with FIG. 4, once STB 120 is initialized, pre-provisioning/provisioning 420 may automatically perform provisioning operations associated with STB 120. In one example, pre-provisioning/provisioning 420 may include STB 120 automatically sending an activation message to server 140. Server 140 may activate STB 120 (e.g., may send program entitlements to STB 120) based on the activation message. After pre-provisioning/provisioning 420 is performed, service check 430 of STB 120 may be performed. Service check 430 may automatically perform checks of services associated with STB 120. For example, service check 430 may include STB 120 automatically checking EPG, VOD, DVR, program entitlements, etc. associated with STB 120 (e.g., via interaction with server 140).

Figure 24:
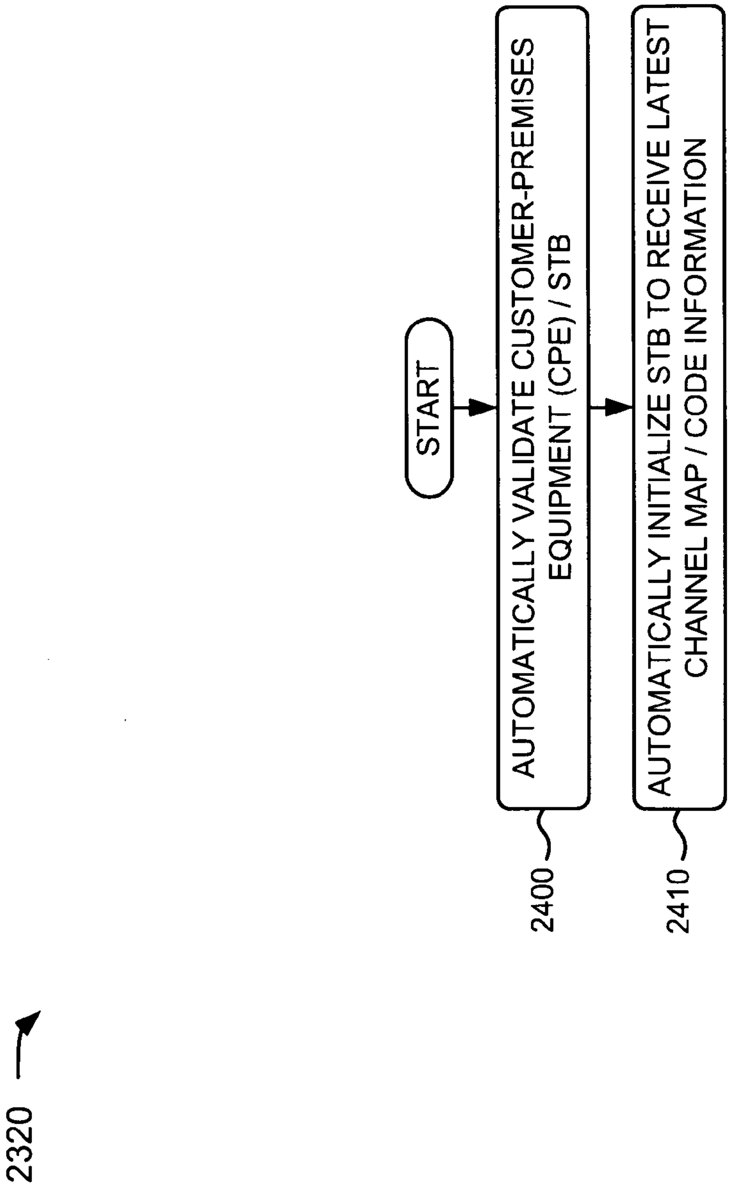

Process block 2320 may include the process blocks depicted in FIG. 24. As shown in FIG. 24, process block 2320 may include automatically validating customer-premises equipment (CPE) and/or the STB (block 2400), and automatically initializing the STB to receive a latest channel map and/or code information (block 2410). For example, in implementations described above in connection with FIG. 5, STB 120 and/or server 140 may automatically validate customer premises equipment (CPE), as indicated by reference number 510. CPE may include any equipment (e.g., a television, a DVR, STB 120, etc.) provided at the premises of a customer associated with STB 120. In one example, server 140 may receive information associated with STB 120 (e.g., and other CPE), such as serial numbers, identification numbers, etc. Server 140 may compare the received information to valid information (e.g., valid serial numbers, identification numbers, etc.) contained in a database associated with server 140, and may validate the CPE based on the comparison. After CPE validation 510, STB 120 (e.g., via server 140) may automatically initialize a channel map associated with STB 120, as indicated by reference number 520. In one example, channel map initialization 520 may include STB 120 automatically sending an initialization (INIT) message to server 140. Server 140 may initialize STB 120 and may send a channel map, codes associated with the channel map, etc. to STB 120 based on the INIT message.

Figure 25:

Process block 2330 may include the process blocks depicted in FIG. 25. As shown in FIG. 25, process block 2330 may include automatically activating the STB to receive program entitlement information (block 2500), and automatically validating a cable card associated with the STB (block 2510). For example, in implementations described above in connection with FIG. 5, after channel map initialization 520, STB 120 (e.g., via server 140) may automatically activate STB 120, as indicated by reference number 530. In one example, activation 530 may include STB 120 automatically sending an activation message to server 140. Server 140 may activate STB 120 based on the activation message. After activation 530, STB 120 (e.g., via server 140) may automatically validate any cable cards associated with STB 120, as indicated by reference number 540. In one example, server 140 may receive (e.g., from STB 120) information associated with the cable cards, such as serial numbers, identification numbers, etc. Server 140 may compare the received information to valid information (e.g., valid serial numbers, identification numbers, etc.) contained in a database associated with server 140, and may validate the cable cards based on the comparison.

Figure 26:
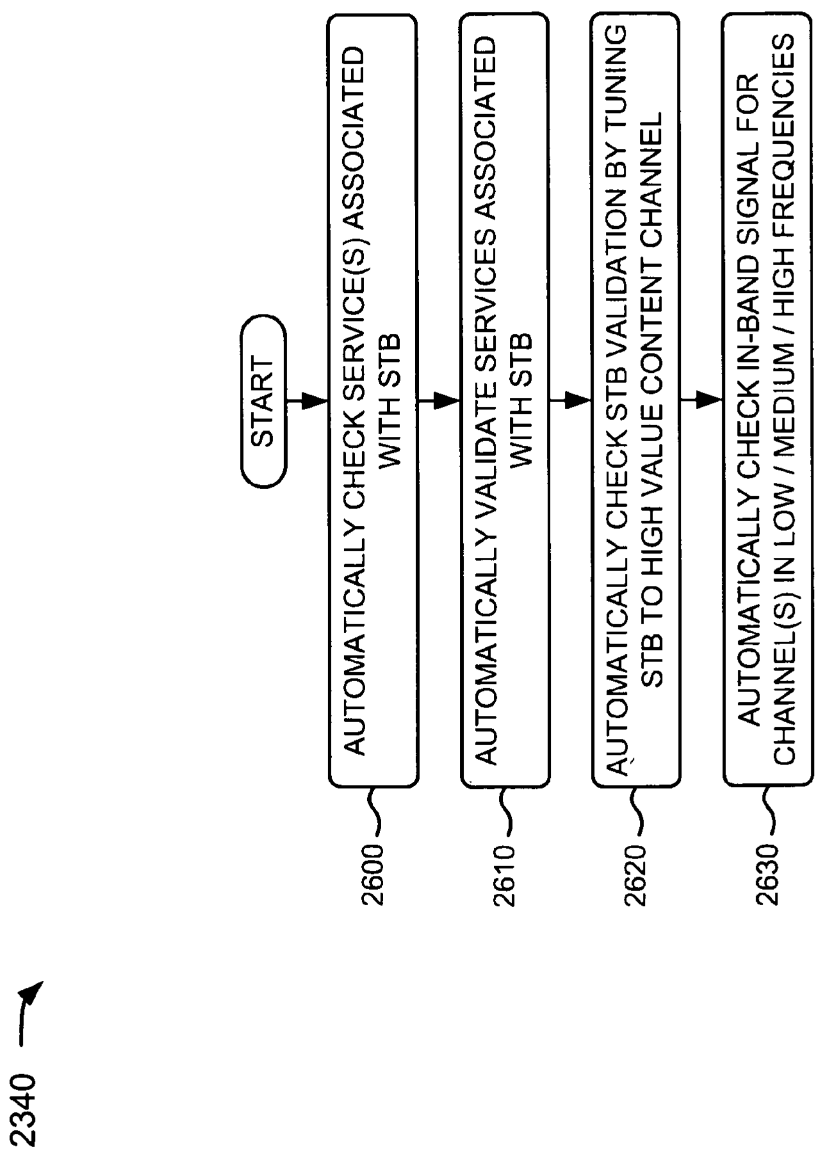

Process block 2340 may include the process blocks depicted in FIG. 26. As shown in FIG. 26, process block 2340 may include automatically checking one or more services associated with the STB (block 2600), and automatically validating the one or more services associated with the STB (block 2610). For example, in implementations described above in connection with FIG. 6, STB 120 (e.g., via server 140) may automatically check services associated with STB 120, as indicated by reference number 610. Services check 610 may include STB 120 automatically sending a request, to server 140, for available services (e.g. available to STB 120). Server 140 may send the available services to STB 120, and STB 120 may compare the received available services to a list of services (e.g., for which STB 120 should be enabled) provided in a database associated with STB 120. After services check 610, STB 120 (e.g., via server 140) may automatically validate the services associated with STB 120, as indicated by reference number 620. Services validation 620 may include STB 120 automatically determining if the services associated with STB 120 are functioning correctly.

As further shown in FIG. 26, process block 2340 may include automatically checking the STB validation by tuning the STB to a high value content channel (block 2620), and automatically checking an in-band signal for one or more channels in low, medium, and high frequencies (block 2630). For example, in implementations described above in connection with FIG. 6, after services validation 620, STB 120 (e.g., via server 140) may automatically check the validation of STB 120, as indicated by reference number 630. STB validation check 630 may include STB 120 tuning to a high value content channel associated with STB 120, and determining if the high value content channel is functioning properly. After STB validation check 630, STB 120 (e.g., via server 140) may automatically check in-band signals for one or more channels associated with STB 120, as indicated by reference number 640. In one implementation, in-band signal check 640 may include STB 120 automatically checking in-band signals for three channels (e.g., a low frequency channel, a medium frequency channel, and a high frequency channel) received by STB 120 from server 140.

Systems and/or methods described herein may enable a field technician installing or replacing a set-top box (STB) at a customer's premises to automatically provision the STB and to automatically perform a health check of the STB. Such an arrangement may reduce STB installation time and may improve the field technician's efficiency during installation of the STB (e.g., may reduce human errors). Furthermore, the systems and/or methods described herein may enable the provider of the STB to ship the STB to a customer, and the customer may install the STB (e.g., without a field technician). This may increase customer satisfaction (e.g., the customer does not need to wait for the field technician), and may eliminate the cost of dispatching a field technician. The systems and/or methods described herein may also enable an installed STB (e.g., that loses information) to correct itself and recover the lost information.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIGS. 23-26, the order of the blocks may be modified in other implementations. Further, non-dependent blocks may be performed in parallel.

It will be apparent that aspects, as described herein, may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware may be designed to implement these aspects based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "tone" or similar language is used. Further, the phrase "based on" is intended to mean "based, at least in part, on" unless explicitly stated otherwise.

What is claimed is:

1. A method comprising:

detecting activation of a set-top box;

performing, by a processor of the set-top box and based on the activation of the set-top box, a health check of the set-top box, performing a health check comprising performing at least one of:

checking, automatically, an Internet protocol (IP)/Ethernet connection associated with the set-top box prior to the set-top box connecting to a server, or checking, automatically, an out-of-band (OOB) channel associated with the set-top box prior to the set-top box connecting to the server;

detecting connection of the set-top box with a network; and performing, by the processor and based on the connection of the set-top box with the network, the following:

a pre-provisioning of the set-top box, a provisioning of the set-top box, and a service check of the set-top box, performing the service check including:

determining a first channel from a plurality of channels, the first channel being associated with at least one characteristic of high value content, the at least one characteristic including high definition;

tuning the set-top box to the determined first channel;

checking, after tuning to the determined first channel, an in-band signal for a second channel, the in-band signal for the second channel being associated with a first frequency;

checking an in-band signal for a third channel, the in-band signal for the third channel being associated with a second frequency, and the second frequency being greater than the first frequency; and checking an in-band signal for a fourth channel, the in-band signal for the fourth channel being associated with a third frequency, and the third frequency being greater than the first frequency and being greater than the second frequency.

2. The method of claim 1, where performing the pre-provisioning of the set-top box comprises:

validating the set-top box to determine that the set-top box is not stolen, and initializing the set-top box to receive a latest channel map and code information associated with the latest channel map when the set-top box is validated as not stolen.

3. The method of claim 2, where validating the set-top box comprises:

providing, to the server, identification information associated with the set-top box, where the server determines whether the set-top box is valid based on the identification information.

4. The method of claim 2, where initializing the set-top box comprises:

sending an initialization (INIT) message to the server, where the server initializes the set-top box, and receiving, from the server, the latest channel map and the code information associated with the latest channel map based on the initialization (INIT) message.

5. The method of claim 1, where performing the provisioning of the set-top box comprises at least one of:

activating the set-top box to receive program entitlement information associated with the set-top box, or validating a cable card associated with the set-top box.

6. The method of claim 5, where activating the set-top box comprises:

sending an activation message to the server, where the server activates the set-top box based on the activation message, and receiving, from the server, the program entitlement information associated with the set-top box based on the activation message.

7. The method of claim 5, where validating the cable card comprises:

providing, to the server, identification information associated with the cable card, where the server determines whether the cable card is valid based on the identification information.

8. The method of claim 1, where performing the service check of the set-top box further comprises:

checking one or more services associated with the set-top box, validating the one or more services associated with the set-top box, and checking a validation associated with the set-top box.

9. The method of claim 8, where checking one or more services comprises:

sending a request, to the server, for the one or more services associated with the set-top box, receiving, from the server, the one or more services associated with the set-top box, and determining if the received one or more services are complete.

10. The method of claim 8, where validating the one or more services comprises:

determining whether the one or more services associated with set-top box are functioning.

11. The method of claim 8, where checking the validation associated with the set-top box comprises:

tuning the set-top box to a particular content channel associated with the set-top box, and determining if the particular content channel is functioning.

12. A set-top box comprising:

a memory to store instructions; and a processor to execute the instructions in the memory to:

detect activation of the set-top box, perform, based on detecting the activation, a health check, the processor, when performing the health check, being further to at least one of:

check an Internet protocol (IP)/Ethernet connection associated with the set-top box prior to the set-top box connecting to a server, or check an out-of-band (OOB) channel associated with the set-top box prior to the set-top box connecting to the server, detect connection of the set-top box with the network, and perform, based on the connection of the set-top box, a pre-provisioning of the set-top box, a provisioning of the set-top box, and a service check of the set-top box, the processor, when performing the service check, being further to:

determine a first channel from a plurality of channels, the first channel being associated with at least one characteristic of high value content, the at least one characteristic including high definition;

tune the set-top box to the determined first channel;

check, after tuning to the determined first channel, an in-band signal for a second channel, the in-band signal for the second channel being associated with a first frequency;

check an in-band signal for a third channel, the in-band signal for the third channel being associated with a second frequency, and the second frequency being greater than the first frequency; and check an in-band signal for a fourth channel, the in-band signal for the fourth channel being associated with a third frequency, and the third frequency being greater than the first frequency and being greater than the second frequency.

13. The set-top box of claim 12, where, when performing the pre-provisioning of the set-top box, the processor further executes instructions in the memory to:

validate the set-top box to determine that the set-top box is not stolen, and initialize the set-top box to receive a latest channel map and code information associated with the latest channel map when the set-top box is validated as not stolen.

14. The set-top box of claim 13, where, when validating the set-top box, the processor further executes instructions in the memory to:

provide, to the server, identification information associated with the set-top box, where the server validates the set-top box based on the identification information.

15. The set-top box of claim 13, where, when initializing the set-top box, the processor further executes instructions in the memory to:

send an initialization (INIT) message to the server, where the server initializes the set-top box in response to the INIT message, and receive, from the server, the latest channel map and the code information associated with the latest channel map based on the INIT message.

16. The set-top box of claim 12, where, when performing the provisioning the set-top box, the processor further executes instructions in the memory to at least one of:

activate the set-top box to receive program entitlement information associated with the set-top box, or validate a cable card associated with the set-top box.

17. The set-top box of claim 16, where, when activating the set-top box, the processor further executes instructions in the memory to:

send an activation message to the server, where the server activates the set-top box based on the activation message, and receive, from the server, the program entitlement information associated with the set-top box based on the activation message.

18. The set-top box of claim 12, where, when performing the service check of the set-top box, the processor further executes instructions in the memory to:

check one or more services associated with the set-top box, validate the one or more services associated with the set-top box, and check a validation associated with the set-top box.

19. The set-top box of claim 18, where, when checking one or more services, the processor further executes instructions in the memory to:

send a request, to the server, for the one or more services associated with the set-top box, receive, from the server, the one or more services associated with the set-top box, and determine if the received one or more services are complete.

20. The set-top box of claim 18, where, when validating the one or more services, the processor further executes instructions in the memory to:

determine whether the one or more services associated with set-top box are functioning.

21. The set-top box of claim 18, where, when checking the validation associated with the set-top box, the processor further executes instructions in the memory to:

tune the set-top box to a particular content channel associated with the set-top box, and determine if the particular content channel is functioning.

22. A non-transitory computer-readable medium storing instructions, the instructions comprising:

one or more instructions, which, when executed by a processor, cause the processor to:

detect activation of a set-top box, perform, based on the activation, a health check, the one or more instructions to perform the health check further including at least one of:

one or more instructions to check an Internet protocol (IP)/Ethernet connection associated with the set-top box prior to the set-top box connecting to a server, or one or more instructions to check an out-of-band (OOB) channel associated with the set-top box prior to the set-top box connecting to the server, detect connection of the set-top box with a network, and perform, based on the connection of the set-top box, a pre-provisioning of the set-top box, a provisioning of the set-top box, and a service check of the set-top box, the one or more instructions to perform the service check further including:

one or more instructions to determine a first channel from a plurality of channels, the first channel being associated with at least one characteristic of high value content, the at least one characteristic including high definition;

one or more instructions to tune the set-top box to the determined first channel;

one or more instructions to check, after tuning to the determined first channel, an in-band signal for a second channel, the in-band signal for the second channel being associated with a first frequency;

one or more instructions to check an in-band signal for a third channel, the in-band signal for the third channel being associated with a second frequency, and the second frequency being greater than the first frequency; and one or more instructions to check an in-band signal for a fourth channel, the in-band signal for the fourth channel being associated with a third frequency, and the third frequency being greater than the first frequency and being greater than the second frequency.

23. The medium of claim 22, where the one or more instructions to perform the service check include:

one or more instructions to check one or more services associated with the set-top box, one or more instructions to validate the one or more services associated with the set-top box, and one or more instructions to check a validation associated with the set-top box.

24. The medium of claim 22, where the one or more instructions to perform the provisioning of the set-top box include at least one of:

one or more instructions to activate the set-top box to receive program entitlement information associated with the set-top box, or one or more instructions to validate a cable card associated with the set-top box.

* * * * *